(12) United States Patent
Yasumura

(10) Patent No.: US 7,310,249 B2
(45) Date of Patent: Dec. 18, 2007

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/536,742

(22) PCT Filed: Nov. 13, 2003

(86) PCT No.: PCT/JP03/14457

§ 371 (c)(1),
(2), (4) Date: Mar. 22, 2006

(87) PCT Pub. No.: WO2004/062076

PCT Pub. Date: Jul. 22, 2004

(65) Prior Publication Data

US 2007/0024255 A1    Feb. 1, 2007

(30) Foreign Application Priority Data

Dec. 27, 2002    (JP) ............................ 2002-381227

(51) Int. Cl.
*H02M 3/335* (2006.01)
(52) U.S. Cl. ............................ 363/24; 363/25; 363/26
(58) Field of Classification Search .................. 363/24, 363/25, 26
See application file for complete search history.

(56) References Cited

U.S. PATENT DOCUMENTS 5,317,496 A * 5/1994 Seiersen ...................... 363/24
5,459,650 A * 10/1995 Noro ............................ 363/24
5,777,859 A * 7/1998 Raets ........................... 363/24
5,999,417 A * 12/1999 Schlecht ...................... 363/16
6,587,359 B2 * 7/2003 Raets et al. ................... 363/24
2007/0024255 A1   2/2007 Yasumura

FOREIGN PATENT DOCUMENTS

JP    2002064981    2/2002

* cited by examiner

*Primary Examiner*—Bao Q. Vu
(74) *Attorney, Agent, or Firm*—Lerner, David, Littenberg, Krumholz & Mentlik, LLP

(57) ABSTRACT

Enhancement of the power conversion efficiency and reduction of switching noise of a power supply circuit are achieved. The power supply circuit includes, on the primary side, a composite resonance type converter formed from a current resonance type converter and a partial voltage resonance circuit in combination, and is configured so as to produce a plurality of secondary side DC output voltages. A particular one of the plural secondary side DC output voltages is controlled to a constant voltage by variably controlling the switching frequency of a primary side switching converter. Each of the remaining secondary side DC output voltages is controlled to a constant voltage by adjusting the level of control current to be supplied to a controlling winding of a control transformer in response to the level of the secondary side DC output voltage to adjust the inductance of a controlling winding of the control transformer inserted in a rectification current path.

10 Claims, 13 Drawing Sheets

SWITCHING POWER SUPPLY CIRCUIT

TECHNICAL FIELD

This invention relates to a switching power supply circuit provided as a power supply in various electronic apparatus.

BACKGROUND ART

Various switching power supply circuits are widely known including, for example, a switching power supply circuit of the flyback converter type or the forward converter type. The switching converters of the types mentioned are restricted in suppression of switching noise because the switching operation waveform is a rectangular waveform. Further, it is known that the switching converters are limited in enhancement in the power conversion efficiency from their operation characteristics.

Therefore, various switching power supply circuits which rely upon various resonance type converters have been proposed by the applicant of the present application. According to the resonance type converters, a high power conversion efficiency can be obtained readily, and low noise is achieved because the switching operation waveform is a sine waveform. Further, the resonance type converters have a merit also that they can be formed from a comparatively small number of parts.

One of the power supply circuits having been applied for patent formerly by the applicant of the present invention is configured such that it includes a voltage resonance type converter as a primary side switching converter and produces and outputs a plurality of secondary side DC output voltages on the secondary side.

Further, for the stabilization of the secondary side DC output voltages, a switching frequency control method which depends upon control of the switching frequency of the primary side switching converter is adopted, for example, with regard to a main one of the primary side DC output voltages. Meanwhile, with regard to another required one of the secondary side DC output voltages, a controlled winding of an orthogonal type control transformer (saturable reactor) is inserted in series to a rectification current path for producing the secondary side DC output voltage. Further, the level of control current to be supplied to a controlling winding of the orthogonal type control transformer is varied in response to the level of the secondary side DC output voltage to vary the inductance of the controlled winding thereby to control the level of current to be supplied to the rectification current path to make the secondary side DC output voltage constant (refer to the official gazette of Japanese Patent Laid-Open No. 2000-064981).

A power supply circuit as a prior art which is formed based on the power supply circuit described above is shown in FIG. 14. Also the power supply circuit shown in FIG. 14 is configured such that it includes a resonance type converter as a primary side switching converter and a plurality of secondary side DC output voltages are produced on the secondary side. However, while the primary side switching converter in the power supply circuit described above is a voltage resonance type converter, that of the power supply circuit shown in FIG. 14 is a current resonance type converter. For example, while the rectification circuit system for producing secondary side DC output voltages adopts a configuration as a half-rectification circuit where the primary side switching converter is a voltage resonance type converter, where the primary side switching converter is a current resonance type converter, it is possible to form a full-wave rectification circuit as the rectification circuit system. This can increase the current capacity as the switching power supply circuit.

In the power supply circuit shown in FIG. 14, a common mode noise filter formed from one common mode choke coil CMC and two across capacitors CL is connected to a commercial AC power supply AC. The common mode noise filter suppresses noise to be transmitted, for example, from the switching converter side to the commercial AC power supply AC.

Further, a full-wave rectification circuit formed from a bridge rectification circuit Di and a smoothing capacitor Ci is provided in the line of the commercial AC power supply AC at the next stage to the common mode noise filter. A rectification smoothed voltage Ei having a level equal to that of an AC input voltage VAC is obtained as a voltage across the smoothing capacitor Ci by rectification smoothing operation by the full wave rectification circuit.

A switching converter which receives and operates with the rectification smoothed voltage Ei as a DC input voltage in this instance has a configuration as a composite resonance type converter which includes at least a partial voltage resonance circuit on the primary side in a basic configuration as a current resonance type converter.

Here, two switching devices Q1 (high side) and Q2 (low side) each formed from a MOS-FET are connected to each other in a half bridge coupling scheme as seen in FIG. 14. Damper diodes DD1 and DD2 are individually connected in parallel to each other and in such directions as seen in FIG. 14 between the drain-source of the switching devices Q1 and Q2, respectively.

Further, a partial resonance capacitor Cp is connected in parallel between the drain-source of the switching device Q2. A parallel resonance circuit (partial voltage resonance circuit) is formed from the capacitance of the partial resonance capacitor Cp and the leakage inductance L1 of a primary winding N1. The partial voltage resonance circuit performs partial voltage resonance operation wherein it voltage resonates only upon turning off of the switching devices Q1 and Q2.

A control IC 2 includes an oscillation circuit for driving the current resonance type converter in a separately excited fashion, a control circuit, a protection circuit and so forth and is formed as an analog IC (Integrated Circuit) for universal use including a bipolar transistor in the inside thereof.

The control IC 2 operates with a DC voltage inputted to a power supply input terminal Vcc. In this instance, the power supply input terminal Vcc is connected to the line of the rectification smoothed voltage Ei through a starting resistor Rs. The control IC2 is started by and operates with the rectification smoothed voltage Ei inputted thereto through the starting resistor Rs. Further, the control IC 2 is grounded to the primary side ground through a ground terminal E.

Further, the control IC 2 includes two drive signal output terminals VGH and VGL as terminals for outputting a drive signal (gate signal) to the switching elements.

A drive signal for switching driving the high side switching element is outputted from the drive signal output terminal VGH, and another drive signal for switching driving the low side switching element is outputted from the drive signal output terminal VGL.

The high side drive signal outputted from the drive signal output terminal VGH is applied to the gate of the switching element Q1. Meanwhile, the low side drive signal outputted from the drive signal output terminal VGL is applied to the gate of the switching element Q2.

The switching elements Q1 and Q2 perform switching operation such that they are alternately switched on/off with a required switching frequency by the drive signals outputted from the drive signal output terminals VGH and VGL, respectively.

An insulating converter transformer PIT transmits switching outputs of the switching elements Q1 and Q2 to the secondary side and in this instance has a primary winding N1 and two secondary windings N2 and N2A wound thereon.

In this instance, the primary winding N1 of the insulating converter transformer PIT is connected at one end thereof to a node (switching output point) between the source of the switching element Q1 and the drain of the switching element Q2 through a series connection of a series resonance capacitor C1. The primary winding N1 is connected at the other end thereof to the primary side ground.

According to the connection scheme described above, a series circuit of the series resonance capacitor C1 and the primary winding N1 is connected to the switching output point of the switching elements Q1 and Q2. Consequently, a primary side series resonance circuit is formed from the capacitance of the series resonance capacitor C1 and a leakage inductance L1 of the insulating converter transformer PIT including the primary winding N1. Since the primary side series resonance circuit is connected to the switching output point in such a manner as described above, the switching output of the switching elements Q1 and Q2 is transmitted to the primary side series resonance circuit. The primary side series resonance circuit performs resonance operation in response to the switching output transmitted thereto. Consequently, operation of the primary side switching converter becomes that of the current resonance type.

Accordingly, operation of the current resonance type by the primary side series resonance circuit (C1-L1) and partial resonance operation by the partial voltage resonance circuit (Cp//L1) described hereinabove are obtained by the primary side switching converter shown in FIG. 14.

In other words, the power supply circuit shown in FIG. 14 adopts a form which includes a combination of a resonance circuit for making the primary side switching converter that of the resonance type with another resonance circuit. In short, the power supply circuit adopts a configuration as a composite resonance type converter An alternating voltage is induced in each of the secondary windings N2 and N2A wound on the secondary side of the insulating converter transformer PIT in response to the switching output transmitted to the primary winding N1.

The secondary winding N2 has a center tap provided thereon as shown in FIG. 14 and connected to the secondary side ground, and a full-wave rectification circuit formed from rectification diodes Do1 and Do2 and a smoothing capacitor Co is connected to the secondary winding N2. Consequently, a secondary side DC output voltage Eo is obtained as a voltage across the smoothing capacitor Co. The secondary side DC output voltage Eo is supplied to the load side not shown and is branched and inputted also as a detection voltage for a control circuit 1 described below.

The control circuit 1 produces a voltage or current whose level is adjusted in response to the level of the secondary side DC output voltage Eo described hereinabove as a control output thereto. The control output is outputted to a control terminal Vc of the control IC 2.

The control IC 2 operates to adjust the frequency of the drive signals in response to the control output level inputted to the control terminal Vc to adjust the frequency of the drive signal for the high side and the drive signal for the low side to be outputted from the drive signal output terminals VGH and VGL while the drive signals maintain the timings at which they are turned on/off alternately.

Consequently, the switching frequency of the switching elements Q1 and Q2 is variably controlled in response to the control output level (that is, the secondary side DC output voltage level) inputted to the control terminal Vc.

When the switching frequency varies, the resonance impedance of the primary side series resonance circuit varies. When the resonance impedance varies, the amount of current to be supplied to the primary winding N1 of the primary side series resonance circuit varies and also the power to be transmitted to the secondary side varies. Consequently, the level of the secondary side DC output voltage Eo varies, and constant voltage control for the secondary side DC output voltage Eo is implemented.

In this instance, a step-down type converter formed from a switching element Q3 formed from a MOS-FE, a rectification diode D3, a choke coil L10, and a smoothing capacitor Co3 in such a manner as seen in FIG. 14 is connected to the secondary side output voltage Eo.

The step-down type converter produces a secondary side DC output voltage Eo2 stepped down from the secondary side DC output voltage Eo by receiving the secondary side DC output voltage Eo as an input thereto and half-wave rectifying an alternating voltage obtained by switching performed by the switching element Q3 by means of the rectification diode D3 and the choke coil L10 to charge the smoothing capacitor Co3.

The constant voltage control of the secondary side DC output voltage Eo2 is performed by a control circuit 3.

The control circuit 3 receives the secondary side DC output voltage Eo2 as an input thereto and, for example, varies the pulse width within one cycle of a drive signal to be outputted to the gate of the switching element Q3 in response to the level of the secondary side DC output voltage Eo2 inputted thereto while controlling the switching frequency constant. In other words, the control circuit 3 preforms PWM control. Consequently, the on-angle of the switching element Q3 within one switching cycle is varied, and as a result, also the level of the secondary side DC output voltage Eo2 varies. By variably controlling the secondary side DC output voltage Eo2 in this manner, stabilization of the secondary side DC output voltage Eo2 is achieved.

Further, a center tap is provided also for the secondary winding N2A and connected to the secondary side ground, and besides, a full-wave rectification circuit is formed from rectification diodes Do3 and Do4 and a smoothing capacitor Co1 in such a manner as seen in FIG. 15. A DC voltage is obtained across the smoothing capacitor Co1.

In this instance, a three-terminal regulator 4 is connected to the DC voltage of an output of the smoothing capacitor Co1 so that a stabilized secondary side DC output voltage Eo1 is obtained as a voltage across the smoothing capacitor Co2.

Here, the load conditions with regard to the secondary side DC output voltages Eo, Eo1 and Eo2 obtained on the secondary side in such a manner as described above are such as given below:

Eo: 5.0 V/6 A to 2 A

Eo1: 12.0 V/1 A to 0.2 A

Eo2: 3.3 V/6 A to 2 A

According to the load conditions given above, the highest load power is applied to the secondary side DC output voltage Eo. Therefore, the constant voltage control of the secondary side DC output voltage Eo is performed using switching frequency control which has the highest controlling capability and provides comparatively low power loss.

The second highest load power next to the secondary side DC output voltage Eo is applied to the secondary side DC output voltage Eo2. Since the load current amount is considerably great also with regard to the secondary side DC output voltage Eo2, in this instance, a step-down type converter is provided as means other than the switching frequency control to achieve a constant voltage.

The remaining secondary side DC output voltage Eo1 is stabilized by simple and easy means by the three-terminal regulator 4 since the load current amount is small.

However, the power supply circuit described hereinabove with reference to FIG. 14 has the following problems.

While the DC/DC power conversion efficiency ($\eta$ DC/DC) of the power supply circuit shown in FIG. 14 is 94% with regard to the secondary side DC output voltage Eo, it is 80% with regard to the secondary side DC output voltage Eo1 and 92% with regard to the secondary side DC output voltage Eo2, and is totally approximately 88%.

In particular, while the circuit shown in FIG. 14 adopts a configuration wherein a series regulator such as the three-terminal regulator 4 and a step-down type converter are added in order to individually stabilize a plurality of secondary side DC output voltages, the series regulator and the step-down type converter inevitably exhibit high power loss. Therefore, where the load power variation is great as a condition of the load side, the power loss further increases, and consequently, also it becomes necessary to provide a heat radiating plate for the series regulator and/or the step-down type converter, which gives rise to, for example, expansion of the circuit scale and/or increase of the cost.

Further, in the power supply circuit shown in FIG. 14, while the switching frequency of the primary side composite resonance type converter is 75 KHz to 100 KHz, the switching frequency of the switching element Q3 in the step-down type converter on the secondary side is fixed, for example, at 100 KHz. Where a plurality of switching frequencies are involved in one power supply circuit in this manner, the switching frequencies interfere with each other and also the level of noise generation becomes higher. Therefore, such a countermeasure against noise such as various types of noise filters or shield plates is required, and also in this regard, expansion of the circuit scale and increase of the cost are invited.

Therefore, it is known to adopt a magnetic amplifier as means for stabilizing the secondary side outputs in place of such a series regulator and a step-down type converter as described above.

FIG. 15 shows an example of a configuration where the secondary side of the power supply circuit shown in FIG. 14 adopts such a magnetic amplifier as described above. It is to be noted that like elements those of FIG. 14 are denoted by like reference characters and description of them is omitted herein.

Referring to FIG. 15, a circuit system for producing the stabilized secondary side DC output voltage Eo1 is configured in the following manner.

First, the secondary winding N2A has a center tap provided thereon and connected to the secondary side ground, and the rectification diodes Do3 and Do4 and the smoothing capacitor Co1 are connected to the secondary winding N2A in such a manner as seen in FIG. 15 to form a full-wave rectification circuit. Thus, the secondary side DC output voltage Eo1 is produced as a voltage across the smoothing capacitor Co1.

In addition, the full-wave rectification circuit of the secondary winding N2A includes a constant voltage circuit (magnetic amplifier constant voltage circuit) which includes a magnetic amplifier, and the secondary side DC output voltage Eo1 is stabilized by the magnetic amplifier constant voltage circuit.

The magnetic amplifier constant voltage circuit includes a saturable inductor (choke coil) SR1 interposed between an end of the secondary winding N2A and the anode of the rectification diode Do3 and another saturable inductor SR2 interposed between the other end of the secondary winding N2A and the anode of the rectification diode Do4. Further, the cathode of a reset voltage adjusting diode DV1 is connected to the anode of the rectification diode Do3, and the cathode of another reset voltage adjusting diode DV2 is connected to the anode of the rectification diode Do4. The anodes of the diodes DV1 and DV2 are connected to the collector of the transistor Q4. The emitter of the transistor Q4 is connected to the positive line for the secondary side DC output voltage Eo1 through a resistor Rc.

The control circuit 3 in this instance controls the magnetic fluxes of the saturable inductors SR1 and SR2 in order to stabilize the secondary side DC output voltage Eo1.

The control circuit 3 is formed as an error amplifier including shunt regulator and so forth and variably controls the base current level of the transistor Q4 in response to the level of the secondary side DC output voltage Eo1 inputted thereto. The collector current level of the transistor Q4 is adjusted by the variable control of the base current level of the transistor Q4. Since the collector of the transistor Q4 is connected to a node between the anodes of the reset voltage adjusting diodes DV1 and DV2, when the collector current level is adjusted, the control voltage for adjusting the reset voltage for the magnetic fluxes of the saturable inductors SR1 and SR2 is adjusted.

Here, the saturable inductor SR (SR1, SR2) is formed by winding a winding Ln of a solid wire by a required number of turns on a circular toroidal core CR, for example, in such a manner as seen in FIG. 16.

FIG. 17 illustrates a B-H diagram where a cobalt type amorphous material is selected as a material of the core of the saturable inductor SR formed in such a manner as described above. The B-H characteristic of the saturable inductor SR exhibits a hysteresis characteristic having a high rectangular ratio as can be seen from the figure.

The magnetic amplifier including such a saturable inductor SR as described above operates in such a manner as seen in FIG. 18. Referring to FIG. 18, the voltage V3 represents a potential between the node between the saturable inductor SR1 and the secondary winding N2A and the center tap of the secondary winding N2A. Meanwhile, the voltage VL1 indicates a voltage across the saturable inductor SR1. The current ID1 represents rectification current flowing to the rectification diode Do3.

Within a period from t0 to t1, the voltage V3 exhibits a state of the positive polarity, and at this time, the saturable inductor SR1 is in an unsaturated state (B0>B>B1). At this time, since the relationship between the voltages V3 and VL1 is V3≈VL1, the current ID1 does not flow to the rectification diode Do3.

Within another period from t1 to t2, since the saturable inductor SR1 exhibits a saturated state (B=B1), the voltage VL1 has the substantially 0 level. Consequently, since the relationship between the voltages V3 and VL1 is V3>VL1, the current ID1 begins to flow to the rectification diode Do3.

Then within a further period from t2 to t3, an output voltage adjustment circuit 11 shown equivalently in FIG. 19 operates. This output voltage adjustment circuit 11 is, in FIG. 15, a control circuit 3 to which the secondary side DC output voltage Eo2 is inputted. As can be seen also from FIG. 19, the control circuit 3 adopts a configuration as an error amplifier. In short, the control circuit 3 compares the level of the secondary side DC output voltage Eo2 divided by the voltage dividing resistors Ro1 and Ro2 with a reference voltage Vref and amplifies an error between them by means of an amplifier formed from an operational amplifier OP and a feedback circuit (Ca, Ra), and then outputs the amplified error through a resistor Rb.

Then, a reset circuit 10 supplies reset current to the saturable inductor SR1 in response to the output from the output voltage adjustment circuit 11 obtained in such a manner as described above. The reset circuit 10 equivalently indicates a function as the reset circuit formed from the resistor Rc, transistor Q4, diodes DV1 and DV2 and saturable inductors SR1 and SR2 shown in FIG. 15.

Supplying operation of reset current by the reset circuit 10 at this time is performed by supplying current of a level corresponding to the output level from the output voltage adjustment circuit 11 to the saturable inductor SR1 through the resistor Rc→transistor Q4→diode DV1. By the reset current, resetting of the saturable inductor SR1 is performed so that the magnetic flux density may be returned to B0.

The time length of the period from t0 to t1 in which the saturable inductor SR1 has an unsaturated state is determined by the reset amount (reset current level) within the period from t2 to t3.

Therefore, the reset amount is increased in response to a rise of the level of the secondary side DC output voltage Eo1 as the tendency to a lighter load increases. Consequently, since the remaining magnetic flux density B0 becomes B0A as seen in FIG. 17, also the period from t0 to t1 which is a period of the unsaturated state can be increased so as to become a period from t0A to t1A as seen in FIG. 18. As the period of the unsaturated state increases in this manner, also the period within which the current ID1 does not flow increases, and consequently, also the power supply period to the load per unit time decreases and also the level of the secondary side DC output voltage Eo1 drops as much.

Then, such operation as described above is performed also on the saturable inductor SR2 side but at a timing at which the waveform illustrated in FIG. 18 exhibits a phase difference of 180°.

In this manner, the circuit shown in FIG. 15 achieves stabilization of the secondary side DC output voltage Eo1 obtained by full-wave rectification.

Further, in FIG. 15, also for the secondary side DC output voltage Eo2 produced on the secondary winding N2 side, a configuration wherein constant voltage control is performed by a magnetic amplifier constant voltage circuit is adopted similarly for the secondary side DC output voltage Eo1 described above.

In short, as a basic configuration for obtaining the secondary side DC output voltage Eo2, a full-wave rectification circuit formed from rectification diodes Do5 and Do6 and a smoothing capacitor Co1 is connected to the secondary winding N2.

In addition, saturable inductors (choke coils) SR3 and SR4, the diodes DV1 and DV2 for reset voltage adjustment, the transistor Q3 for reset current outputting, the resistor Rc and a control circuit 3 are connected to the full-wave rectification circuit in such a manner as seen in FIG. 15 to form a magnetic amplifier constant voltage circuit.

Where such a magnetic amplifier constant voltage circuit as described hereinabove with reference to FIG. 15 is adopted, the constant voltage control by the magnetic amplifier constant voltage circuit is of the type wherein the periods within which the saturable inductor SR exhibits saturated/unsaturated states. This operation is performed in accordance with cyclic timings of the voltage V3 obtained in the secondary winding as can be recognized from the foregoing description. In other words, operations of the saturable inductor SR, reset voltage adjusting diodes DV1 and DV2, and reset current outputting transistors Q3 and Q4, which form the magnetic amplifier constant voltage circuit are held in synchronism with the switching frequency of the primary side switching converter. From this, the problem of increase of the generation amount of noise by interference between different switching frequencies as in the case of, for example, the power supply circuit shown in FIG. 14 is eliminated.

However, also in the circuit shown in FIG. 15, the power loss by the toroidal core CR which forms the saturable inductor SR and the power loss by semiconductor elements such as the reset voltage adjusting diodes DV1 and DV2 and the reset current outputting transistors Q3 and Q4 which form the magnetic amplifier constant voltage circuit are high. Consequently, the problem that the total power conversion efficiency of the power supply circuit drops remains. For example, the total power conversion efficiency ($\eta$ DC/DC) where, for example, the circuit shown in FIG. 15 is used is approximately 86% and is lower than that by the circuit configuration shown in FIG. 14.

Further, in order to form the magnetic amplifier constant voltage circuit, a toroidal core as the saturable inductor SR and semiconductor elements such as diode elements for reset voltage adjustment and transistors for reset current outputting are required. For example, in an actual case, a Schottky diode is selectively used for the diode elements for reset voltage adjustment. Meanwhile, a transistor for 50 V/2 A is selectively used for the transistors for the reset current outputting. Since the semiconductor elements mentioned are comparatively expensive, the circuit shown in FIG. 15 is still disadvantageous in terms of the cost.

This problem is significant particularly where the configuration of the power supply circuit shown in FIG. 14 is used as a basic configuration. In particular, as described hereinabove, where a current resonance type configuration is used as the basic configuration of the primary side switching converter, the rectification circuit system for producing a secondary side DC output voltage can be formed as a full-wave rectification circuit thereby to achieve a configuration by which a greater current capacity can be obtained. However, if it is tried to add a magnetic amplifier constant voltage circuit to a full-wave rectification circuit, then two sets each including a saturable inductor SR and a diode element for reset voltage adjustment are required corresponding to positive/negative rectification current paths.

In this manner, where constant voltage control is performed individually for a plurality of secondary side DC output voltages produced on the secondary side by a switching power circuit which includes, for example, a current resonance type converter on the primary side, the problems of drop of the power conversion efficiency, increase of the cost and so forth caused by addition of the circuit elements for the constant voltage control are involved.

DISCLOSURE OF INVENTION

Therefore, according to the present invention, a switching power supply circuit is configured in the following manner taking the subject described above into consideration.

In particular, the switching power supply circuit includes switching means having a switching element for receiving a DC input voltage as an input thereto to perform switching operation, and switching driving means for switching driving the switching element.

The switching power supply circuit further includes an insulating converter transformer formed by winding thereon at least a primary winding to which a switching output obtained by the switching operation of the switching means is supplied and a plurality of secondary windings in each of which an alternating voltage as the switching output obtained in the primary winding is excited.

The switching power supply circuit further includes plurality of DC output voltage production means for receiving the alternating voltages obtained in the plural secondary windings of the insulating converter transformer as inputs thereto to perform rectification operation to produce secondary side DC output voltages, and frequency controlled type constant voltage controlling means for controlling the switching driving means in response to the level of the secondary side DC output voltage which supplies comparatively high power to a load from among the plural secondary side DC output voltages produced by the plural DC output voltage production means to adjust the switching frequency of the switching means to perform constant voltage control for the secondary side DC output voltage.

The switching power supply circuit further includes inductance controlled type constant voltage controlling means provided corresponding to each of those of the plural secondary side DC output voltages other than the secondary side DC output voltage controlled to a constant voltage by the frequency controlled type constant voltage control means and including a control transformer as a saturable reactor having a controlling winding and a controlled winding wound thereon, the controlled winding being inserted in a secondary side rectification current path for producing the secondary side DC output voltage of a control object, the inductance controlled type constant voltage controlling means adjusting the level of control current to be supplied to the controlling winding in response to the level of the secondary side DC output voltage of the control object to adjust the inductance of the controlled winding to perform constant voltage control for the secondary side DC output voltage of the control object.

According to the configuration described above, the secondary side of the switching power supply circuit of the present invention produces a plurality of secondary side DC output voltages.

Further, that one of the plural secondary side DC output voltages which supplies comparatively high power to a load is controlled to a constant voltage by variably controlling the switching frequency of the primary side switching converter in response to the level of the secondary side DC output voltage.

Meanwhile, each of the remaining secondary side DC output voltages is controlled to a constant voltage by means of the inductance controlled type constant voltage control means. In particular, the inductance controlled type constant voltage control means includes a control transformer as a saturable reactor which includes a controlling winding and a controlled winding, and the controlled winding is inserted in a rectification current path for producing the secondary side DC output voltage of a control object of the control transformer. Then, the level of control current to be supplied to the controlling winding is adjusted in response the level of the secondary side DC output voltage of the control object to vary the inductance of the controlled winding thereby to stabilize the secondary side DC output voltage of the control object.

With the inductance controlled type constant voltage control means having such a configuration as described above, for example, the power loss by the controlling winding is low, and also the required control power for supplying the control current to the controlling winding is very low.

BEST MODE FOR CARRYING OUT THE INVENTION

Figure 1:
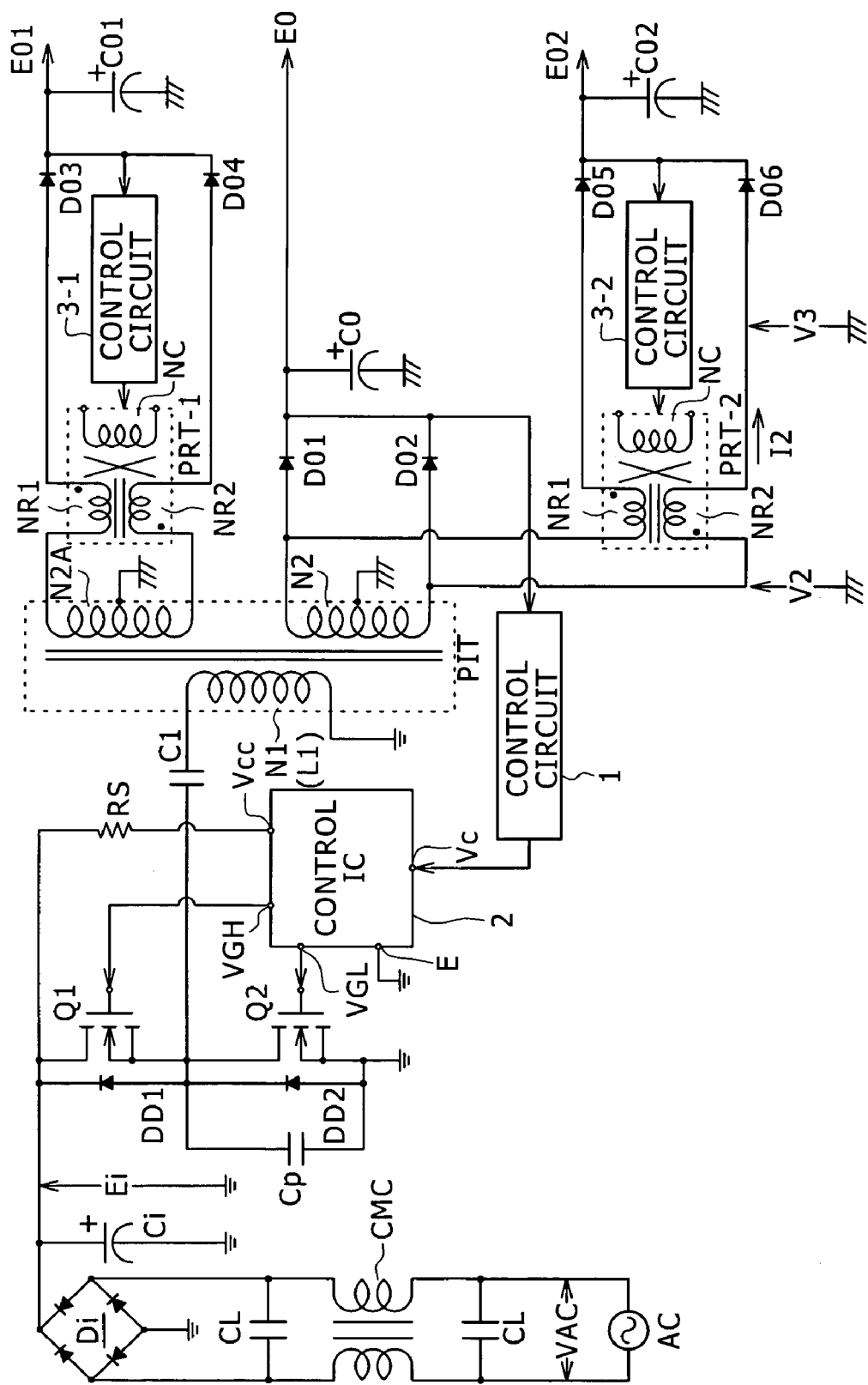
FIG. 1 is a circuit diagram showing an example of a configuration of a power supply circuit as a first embodiment of the present invention.

FIG. 1 shows an example of a configuration of a switching power supply circuit as a first embodiment of the present invention.

In the power supply circuit shown in FIG. 1, a common mode noise filter formed from one common mode choke coil CMC and two across capacitors CL is connected to a commercial AC power supply AC. The common mode noise filter suppresses noise to be transmitted, for example, from the switching converter side to the commercial AC power supply AC.

Further, a full-wave rectification circuit formed from a bridge rectification circuit Di and a smoothing capacitor Ci is provided in the line of the commercial AC power supply AC at the next stage to the common mode noise filter. A rectification smoothed voltage Ei having a level equal to that of an AC input voltage VAC is obtained as a voltage across the smoothing capacitor Ci by rectification smoothing operation by the full wave rectification circuit.

A primary side switching converter which receives and operates with the rectification smoothed voltage Ei as a DC input voltage in this instance has a configuration as a composite resonance type converter which includes at least a partial voltage resonance circuit on the primary side in a basic configuration as a current resonance type converter.

Here, two switching devices Q1 (high side) and Q2 (low side) each formed from a MOS-FET are connected to each other in a half bridge coupling scheme as seen in FIG. 1. Damper diodes DD1 and DD2 are individually connected in parallel to each other and in such directions as seen in FIG. 1 between the drain-source of the switching devices Q1 and Q2, respectively.

Further, a partial resonance capacitor Cp is connected in parallel between the drain-source of the switching device Q2. A parallel resonance circuit (partial voltage resonance circuit) is formed from the capacitance of the partial resonance capacitor Cp and the leakage inductance L1 of a primary winding N1. The partial voltage resonance circuit performs partial voltage resonance operation wherein it voltage resonates only upon turning off of the switching devices Q1 and Q2.

A control IC 2 includes an oscillation circuit for driving the current resonance type converter in a separately excited fashion, a control circuit, a protection circuit and so forth and is formed as an analog IC (Integrated Circuit) for universal use including a bipolar transistor in the inside thereof.

The control IC 2 operates with a DC voltage inputted to a power supply input terminal Vcc. In this instance, the power supply input terminal Vcc is connected to the line of the rectification smoothed voltage Ei through a starting resistor Rs. The control IC2 is started by and operates with the rectification smoothed voltage Ei inputted thereto through the starting resistor Rs. Further, the control IC 2 is grounded to the primary side ground through a ground terminal E.

Further, the control IC 2 includes two drive signal output terminals VGH and VGL as terminals for outputting a drive signal (gate signal) to the switching elements.

A drive signal for switching driving the high side switching element is outputted from the drive signal output terminal VGH, and another drive signal for switching driving the low side switching element is outputted from the drive signal output terminal VGL.

The high side drive signal outputted from the drive signal output terminal VGH is applied to the gate of the switching element Q1. Meanwhile, the low side drive signal outputted from the drive signal output terminal VGL is applied to the gate of the switching element Q2.

It is to be noted that, though not shown in FIG. 1, a boot strap circuit formed from a peripheral externally provided part is actually connected to the control IC 2. The boot strap circuit is for shifting the level of the drive signal to be applied to the switching element Q1 for the high side so that it has a level with which it can appropriately drive the switching element Q1.

Further, although also such part elements as a gate resistor and a gate-source resistor are actually connected to the switching elements Q1 and Q2, they are omitted in FIG. 1.

In the control IC 2, an oscillation signal of a required frequency is produced by an oscillation circuit therein. It is to be noted that the oscillation circuit adjusts the frequency of the oscillation signal in response to the level of a control output inputted from a control circuit 1 to a terminal Vc as hereinafter described.

Thus, the control IC 2 makes use of the oscillation signal produced by the oscillation circuit to produce a drive signal for the high side and another drive signal for the low side. The drive signal for the high side is outputted from a drive signal output terminal VGH, and the signal for the low side is outputted from another drive signal output terminal VGL.

The drive signal for the high side and the drive signal for the low side have a waveform wherein an on period within which a pulse of a rectangular wave of the positive polarity is generated and an off period within which 0 V is generated are obtained within one switching period. Further, while the drive signals have such a common waveform as described above, they have output timings having a phase difference of 180° from each other.

Since the drive signals having the waveforms are applied to the switching elements Q1 and Q2, the switching elements Q1 and Q2 perform switching operation such that they are alternately switched on and off with a switching frequency which depends upon the oscillation frequency of the oscillation circuit.

It is to be noted that, in actual switching operation, a short period of dead time wherein both of the switching elements Q1 and Q2 exhibit an off state is formed within a period of time after the switching element Q1 is turned off until the switching element Q2 is turned on and within another period of time after the switching element Q2 is turned off until the switching element Q1 is turned.

The dead time is a period of time within which both of the switching elements Q1 and Q2 are off. The dead time is formed in order that charging and discharging operation can be obtained with certainty within a short period of time at timings at which the switching elements Q1 and Q2 are turned on/off as partial voltage resonance operation. The time length of such dead time as just described can be set, for example, by the control IC 2 side. In particular, the control IC 2 adjusts the duty ratio of the pulse width of the drive signals to be outputted from the drive signal output terminals VGH and VGL so that a dead time period of the set time length may be formed.

An insulating converter transformer PIT is provided in order to transmit switching outputs of the switching elements Q1 and Q2 to the secondary side.

In this instance, the primary winding N1 of the insulating converter transformer PIT is connected at one end thereof to a node (switching output point) between the source of the switching element Q1 and the drain of the switching element Q2 through a series connection of a series resonance capacitor C1. The primary winding N1 is connected at the other end thereof to the primary side ground.

According to the connection scheme described above, a series circuit of the series resonance capacitor C1 and the primary winding N1 is connected to the switching output point of the switching elements Q1 and Q2. Consequently, a primary side series resonance circuit is formed from the capacitance of the series resonance capacitor C1 and a leakage inductance L1 of the insulating converter transformer PIT including the primary winding N1. Since the primary side series resonance circuit is connected to the switching output point in such a manner as described above, the switching output of the switching elements Q1 and Q2 is transmitted to the primary side series resonance circuit. The primary side series resonance circuit performs resonance operation in response to the switching output transmitted thereto. Consequently, operation of the primary side switching converter becomes that of the current resonance type.

In other words, operation of the current resonance type by the primary side series resonance circuit (C1-L1) and partial resonance operation by the partial voltage resonance circuit (Cp//L1) described hereinabove are obtained by the primary side switching converter shown in FIG. 1.

In other words, the power supply circuit shown in FIG. 1 adopts a configuration as a composite resonance type converter which includes a combination of a resonance circuit for making the primary side switching converter that of the resonance type with a different resonance circuit. It is to be noted that, in the composite resonance type converter described in the present specification, the different resonance circuit may be provided on the primary side or otherwise on the secondary side. In the case of the circuit shown in FIG. 1, a partial voltage resonance circuit is provided as the different resonance circuit.

Although description with reference to the drawings is omitted, the insulating converter transformer PIT is structured such that it includes, for example, an EE type core which is formed from a combination of E type cores made of a ferrite material. Further, a wiring receiving portion of the insulating converter transformer PIT is divided into winding receiving portions for the primary side and the secondary side, and the primary winding N1 and secondary windings N2 and N2A which are described below are wound on a central magnetic leg of the EE type core.

Further, a gap of 1.0 mm to 1.5 mm is formed in the central magnetic leg of the EE type core of the insulating converter transformer PIT. Consequently, a rough coupling state with a coupling coefficient of approximately 0.7 to 0.8 is obtained.

The secondary side of the power supply circuit shown in FIG. 1 produces and outputs a plurality of secondary side DC output voltages and in this instance outputs three secondary side DC output voltages including secondary side DC output voltages Eo, Eo1 and Eo2.

In order to obtain three secondary side DC output voltages in this manner, in the circuit shown in FIG. 1, two secondary windings N2 and N2A are wound on the secondary side of the insulating converter transformer PIT. The secondary side DC output voltages Eo and Eo2 are produced from the secondary winding N2 side, and the secondary side DC output voltage Eo1 is produced from the secondary winding N2A side and outputted. Further, the present embodiment is configured such that constant voltage control is performed individually for each of the secondary side DC output voltages Eo, Eo1 and Eo2 obtained in this manner.

The secondary winding N2 has a center tap provided thereon as shown in FIG. 1 and connected to the secondary side ground, and a full-wave rectification circuit formed from rectification diodes Do1 and Do2 and a smoothing capacitor Co is connected to the secondary winding N2. Consequently, a secondary side DC output voltage Eo is obtained as a voltage across the smoothing capacitor Co. The secondary side DC output voltage Eo is supplied to the load side not shown and is branched and inputted also as a detection voltage for a control circuit 1 described below.

While stabilization of the secondary side DC output voltage Eo is performed by execution of constant voltage control according to a switching frequency controlling method by a constant voltage control circuit system which includes the control circuit 1, this is hereinafter described.

To the secondary winding N2, a full-wave rectification circuit for producing the secondary side DC output voltage Eo is connected in parallel to the full-wave rectification circuit for the secondary side DC output voltage Eo described above.

In particular, to one of the opposite end portions of the secondary winding N2, the anode of a rectification diode Do5 is connected through a series connection of a controlled winding NR1 of an orthogonal control transformer PRT-2 hereinafter described. Meanwhile, to the other end portion of the secondary winding N2, the anode of another rectification diode Do6 is connected through a series connection of the controlled winding NR1 of the orthogonal control transformer PRT-2. The cathodes of the rectification diodes Do5 and Do6 are connected to the positive terminal of a smoothing capacitor Co2. The negative terminal of the smoothing capacitor Co2 is connected to the secondary side ground. Here, the controlled winding NR1 of the orthogonal control transformer PRT-2 is connected at a winding ending end portion thereof to the secondary winding N2 side and connected at a winding starting end portion thereof to the rectification diode Do5 side. In contrast, another controlled winding NR2 is connected at a winding starting end portion thereof to the secondary winding N2 side and connected at a winding ending end portion thereof to the rectification diode Do5 side.

By the full-wave rectification circuit formed in this manner, the secondary side DC output voltage Eo2 is obtained as a voltage across the smoothing capacitor Co2.

While description is hereinafter given, stabilization of the secondary side DC output voltage Eo2 is performed by a constant voltage control circuit system formed from a control circuit 3-2 and the orthogonal control transformer PRT-2.

A center tap is provided for the secondary winding N2A of the different secondary winding set and is connected to the secondary side ground, and a full-wave rectification circuit formed from rectification diodes Do3 and Do4 and a smoothing capacitor Co1 is connected in a connection scheme similar to that for the secondary side DC output voltage Eo2 described hereinabove to the secondary winding N2A. The full-wave rectification circuit produces the secondary side DC output voltage Eo1 as a voltage across the smoothing capacitor Co1. Also in this instance, the controlled windings NR1 and NR2 of the orthogonal control transformer PRT-1 are inserted in series between the anodes of the rectification diodes Do3 and Do4 and the end portions of the secondary winding N2A, respectively.

Stabilization of the secondary side DC output voltage Eo1 is performed by a constant voltage control circuit system formed from a control circuit 3-1 and the orthogonal control transformer PRT-1.

The load conditions with regard to the secondary side DC output voltages Eo, Eo1 and Eo2 in the power supply circuit shown in FIG. 1 are such as given below:

$Eo$=5.0 V/6 A to 2 A $Eo1$=12.0 V/1 A to 0.2 A $Eo2$=3.3 V/6 A to 2 A

Now, a configuration for stabilizing the secondary side DC output voltages Eo, Eo1 and Eo2 described above is described.

First, stabilization of the secondary side DC output voltage Eo to which the highest load power is applied is performed in the following manner.

In order to make the secondary side DC output voltage Eo a constant voltage, the secondary side DC output voltage Eo is inputted as a detection voltage to the control circuit 1. The control circuit 1 produces current or a voltage, whose level is adjusted in response to the level of the secondary side DC output voltage Eo, as a control output. The control output is outputted to the control terminal Vc of the control IC 2.

The control IC 2 operates in response to the control output level inputted to the control terminal Vc so as to vary the drive signal for the high side and the drive signal for the low side to be outputted from the drive signal output terminals VGH and VGL, respectively, with the frequencies of the drive signals kept in synchronism with each other while the timings at which the drive signals are turned on/off alternately are maintained. In particular, the control IC 2 varies the oscillation frequency of the internal oscillation circuit.

Consequently, the switching frequency of the switching elements Q1 and Q2 is adjustably controlled in response to the control output level (that is, the secondary side DC output voltage level) inputted to the control terminal Vc.

When the switching frequency is adjusted, the resonance impedance of the primary side series resonance circuit varies. When the resonance impedance varies in this manner, the amount of current to be supplied to the primary winding N1 varies and also the power to be transmitted to the secondary side varies. Consequently, the level of the secondary side DC output voltage Eo varies, and constant voltage control of the secondary side DC output voltage Eo is achieved thereby.

Now, a configuration for stabilizing the secondary side DC output voltage Eo2 is described.

As can be recognized also from the foregoing description, the constant voltage control circuit system for the secondary side DC output voltage Eo2 includes the orthogonal control transformer PRT-2 and the control circuit 3-2.

Here, a structure of the orthogonal control transformer PRT-2 is described with reference to FIG. 2. It is to be noted that also the orthogonal control transformer PRT-1 provided for the secondary side DC output voltage Eo2 side has a similar structure.

Figure 2:
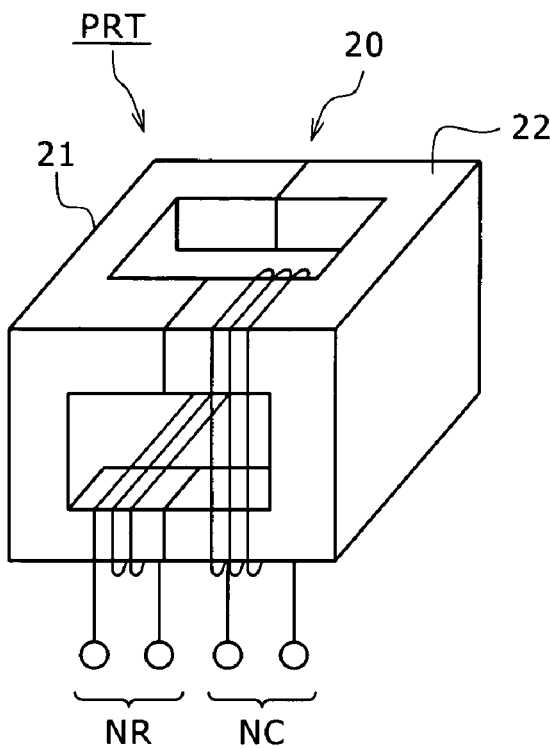
FIG. 2 is a circuit diagram showing an example of a structure of an orthogonal type control transformer.

As seen in FIG. 2, the orthogonal control transformer PRT (PRT-1, PRT-2) includes two double channel-shaped cores 21 and 22 made of, for example, ferrite. Each of the double channel-shaped cores 21 and 22 has four magnetic legs as seen in FIG. 2. A solid core 20 is formed by joining end portions of the magnetic legs of the two double channel-shaped cores 21 and 22 to each other.

In this instance, the joining portions of the magnetic legs of the double channel-shaped cores 21 and 22 do not have a gap formed therein.

Further, a controlled winding NR (NR1, NR2) is wound on two magnetic legs of the double channel-shaped core 21 while a controlling winding NC is wound on two magnetic legs of the double channel-shaped core 21 in such a manner as seen in FIG. 2. In this instance, the winding directions of the controlled winding NR and the controlling winding NC are such that the controlling winding NC is orthogonal to the controlled winding NR as seen in FIG. 2. Consequently, no transformer coupling is provided between the controlled winding NR and the controlling winding NC. Thus, a configuration as a saturable rector having a characteristic that the inductance of the controlled winding NR varies in response to the level of DC current flowing through the controlling winding NC is obtained.

In the orthogonal control transformer PRT in the present embodiment, the controlled winding NR (NR1, NR2) is formed by winding a polyurethane-coated copper wire of 60 $\mu m\phi$/80 strands by 4 T (turns). Meanwhile, the controlling winding NC is formed by winding, for example, a polyurethane-coated copper wire of 60 $\mu m\phi$ by 1,000 T (turns).

Figure 3:
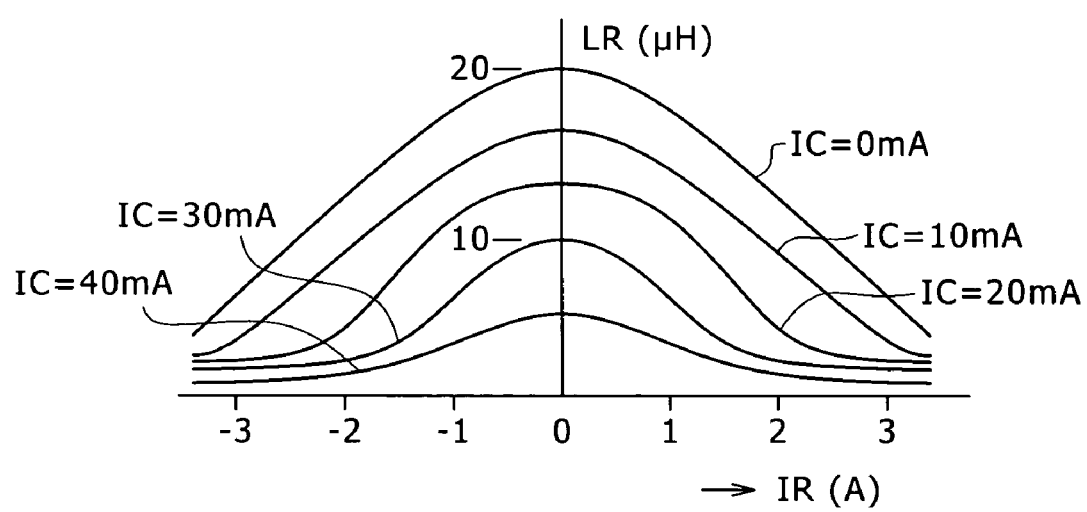
FIG. 3 is a characteristic diagram illustrating an inductance characteristic of a controlled winding.

Under such winding specifications as described above, the inductance LR of the controlled winding NR exhibits such a DC superposition characteristic as illustrated in FIG. 3. In FIG. 3, the axis of ordinate indicates the inductance LR and the axis of abscissa indicates the current IR flowing to the controlled winding NR.

As can be recognized from FIG. 3, the inductance LR indicates a variation range of LR=20 $\mu$H to 1.5 $\mu$H with respect to the variation range of the control current Ic=10 mA to 40 mA.

The control circuit 3-2 adjusts the DC current level of the control current to be supplied to the controlling winding NC in response to an error of the level of the secondary side DC output voltage Eo2 inputted as a detection voltage thereto and outputs the adjusted DC current level.

As the level of control current flowing to the controlling winding NC of the orthogonal control transformer PRT-2 is adjusted in this manner, the inductance LR of the controlled winding NR varies in such a manner as seen in FIG. 3.

Here, where the inductance of the secondary winding N2 by which an alternating voltage on which the secondary side DC output voltage Eo2 is based is represented by L2 and the potential between a node between the secondary winding N2 and the controlled winding NR2 of the orthogonal control transformer PRT-2 and the secondary side ground is represented by V2, the potential V3 between the anode of the rectification diode Do6 which forms the rectification circuit system for the secondary side DC output voltage Eo2 and the secondary side ground is represented in the following manner.

$$V3=V2\times(L2/(L2+LR))=V2\times(1+(LR/L2)) \qquad \text{(Expression 1)}$$

As can be recognized from Expression 1, the level of the potential V3 varies by adjustment of the inductance LR.

When the level of the potential V3 varies, also the level of the secondary side DC output voltage Eo2 varies in response to the variation of the same. Accordingly, when the inductance LR of the controlled winding NR is adjusted in response to the level error of the secondary side DC output voltage Eo2 in such a manner as described above, the level of the secondary side DC output voltage Eo2 is controlled so as to be stabilized.

Figure 4:
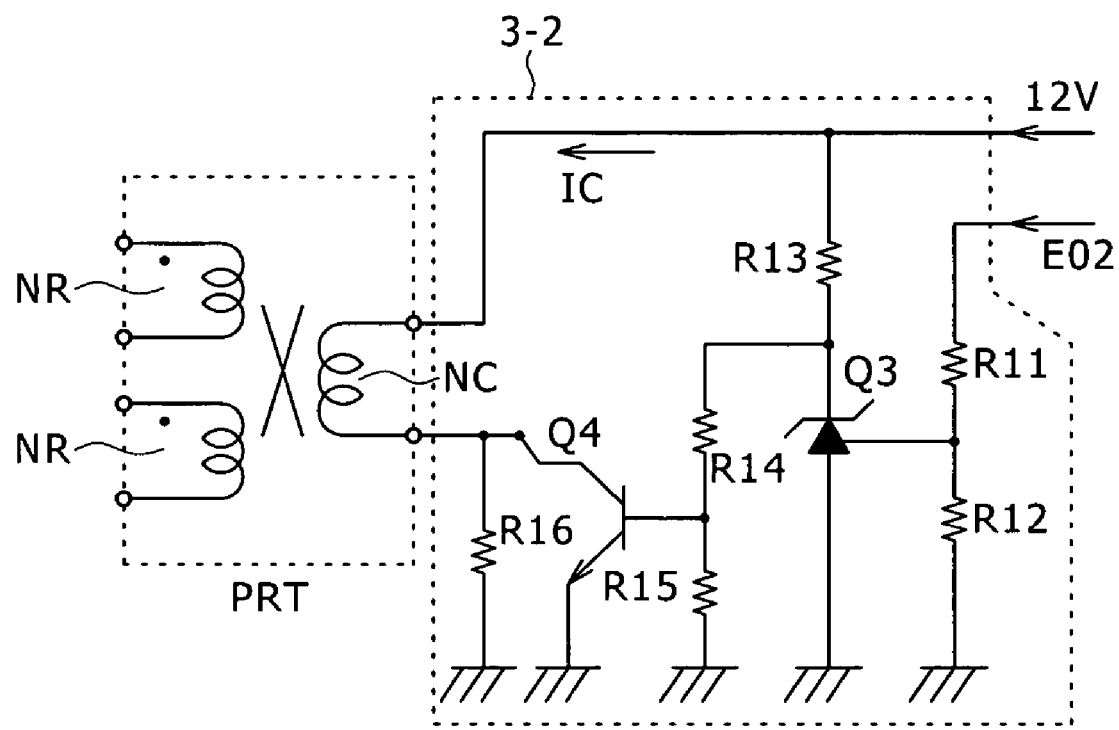
FIG. 4 is a circuit diagram showing an example of a configuration of a control circuit on the secondary side corresponding to the first embodiment.

An example of an internal configuration of the control circuit 3-2 is shown in FIG. 4.

In the control circuit 3-2 shown in FIG. 4, the secondary side DC output voltage Eo2 is divided by voltage dividing resistors R11-R12, and the divided voltage level is inputted to a control terminal of a shunt regulator Q3. Through the shunt regulator Q3, current of a level corresponding to the error of the divided voltage level (level of the secondary side DC output voltage Eo2) inputted to the control terminal flows from a power supply line of 12 V through a resistor R13. It is to be noted that the power supply line of 12 V may be derived, for example, from the secondary side DC output voltage Eo1.

The base of a transistor Q4 is connected to a node between the shunt regulator Q3 and a series circuit of resistors R14-R15 connected in parallel to each other. Meanwhile, the collector of the transistor Q4 is connected to the 12 V power supply line through a series connection of the controlling winding NC of the orthogonal control transformer PRT-2. The emitter of the transistor Q4 is connected to the secondary side ground, and a resistor R16 is connected in parallel to the emitter of the transistor Q4.

Where such a connection scheme as described above is used, DC current of the level amplified in response to the level of current flowing to the shunt regulator Q3 flows to the collector of the transistor Q4. The DC current becomes the control current to the controlling winding NC.

In this manner, the control circuit 3-2 detects the level error of the secondary side DC output voltage Eo2 by means of the shunt regulator Q3 and supplies collector current of the transistor Q4, whose level is adjusted in response to the detected error, as control current to the controlling winding NC. In other words, the control circuit 3-2 is configured so as to supply DC current, whose level is adjusted in response to the level error of the secondary side DC output voltage Eo2, as control current to the controlling winding NC.

It is to be noted that the control circuit 3-2 formed based on the circuit configuration shown in FIG. 4 is actually configured such that the resistance value of the controlling winding NC of the orthogonal control transformer PRT-2 is set to 20Ω so that the control current Ic may have a control range of Ic=10 mA to 30 mA. By setting such a control range as just described, constant voltage control ready for the actual load variation of the secondary side DC output voltage Eo2 is implemented.

Figure 5:
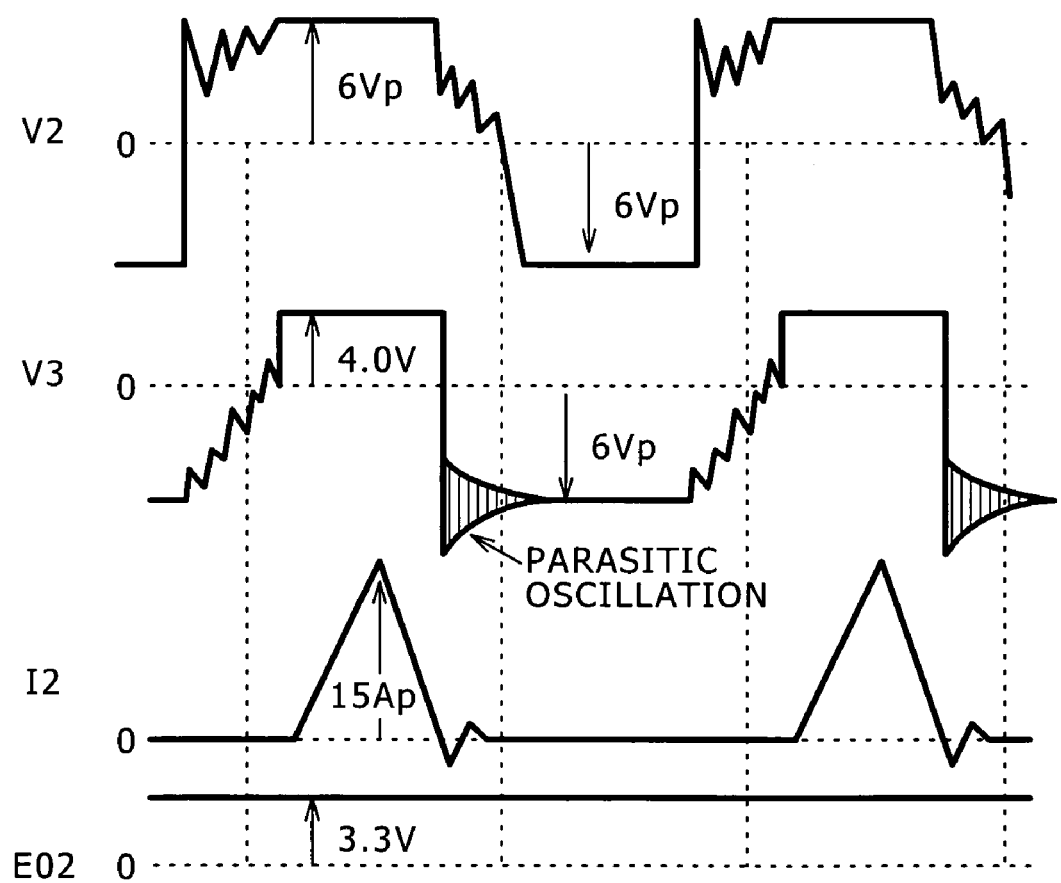
FIG. 5 is a waveform diagram illustrating constant voltage control operation by the control circuit on the secondary side in the power supply circuit of the first embodiment.

A waveform diagram of FIG. 5 illustrates operation of the constant voltage control circuit system for the secondary side DC output voltage Eo2 described above. The operation illustrated in FIG. 5 indicates operation where the secondary side DC output voltage Eo2 is Eo2=3.3 V/6 A.

First, for the potential V2, a waveform is obtained which is reversed between the positive and negative polarities for each one cycle in response to the cycle of the alternating voltage obtained by the secondary winding N2 in such a manner as seen in FIG. 5. The peak levels of the positive and negative polarities are 6 Vp.

Also the potential V3 has a waveform which is reversed between the positive and negative polarities at cyclical timings same as those of the potential V2. However, the waveform of the positive polarity of the potential V3 within the on period of the rectification diode Do6 exhibits a drop to 4 V. This arises from the fact that the potential V3 is controlled so as to change from 6 V to 4 V by an influence of the variable control of the inductance LR2 of the controlled winding NR2 as indicated by Expression 1 given hereinabove. In other words, it is indicated from comparison between the potential V3 and the potential V2 in FIG. 5 that constant voltage control operation by the control circuit 3-2 and the orthogonal control transformer PRT-2 is obtained.

Then, within a period within which the potential V3 has the positive polarity, rectification current I2 flows through the rectification diode Do6 to charge the smoothing capacitor Co2.

Further, though not illustrated in FIG. 5, within a period within which the potential V3 has the negative polarity in FIG. 5, similar operation is obtained in the rectification current path system of the rectification diode Do5 side because the inductance LR1 of the controlled winding NR1 is variably controlled.

As a result of such operation as described above obtained in this manner, the secondary side DC output voltage Eo2 formed as a constant voltage so as to be, for example, 3.3 V fixed is obtained.

It is to be noted that, also in the constant voltage control circuit system for the secondary side DC output voltage Eo1 connected to the secondary winding N2A, the orthogonal control transformer PRT-1 and the control circuit 3-1 operate similarly to the orthogonal control transformer PRT-2 and the control circuit 3-2 described above, respectively. Consequently, also the secondary side DC output voltage Eo1 is stabilized similarly to the secondary side DC output voltage Eo2.

It is to be noted that the control range of the control current Ic in the control circuit 3-1 and so forth are arbitrarily set taking actual load variation of the secondary side DC output voltage Eo1 and so forth into consideration.

In this manner, the power supply circuit shown in FIG. 1 produces and outputs a plurality of secondary side DC output voltages. Then, for the secondary side DC output voltage Eo to which the highest load power is applied, constant voltage control by the switching frequency control method is performed, and for the other remaining secondary side DC output voltages Eo1 and Eo2, the orthogonal control transformer PRT is provided such that stabilization is achieved by adjusting the inductance of the controlled winding NR of the orthogonal control transformer PRT inserted in the rectification current path.

Here, the power loss by the controlled winding NR of the orthogonal control transformer PRT is low, and the control power required by the control circuits 3-1 and 3-2 and so forth for adjustment of the inductance of the controlled winding NR is approximately 0.4 W.

As a result, the power conversion efficiency ($\eta$DC/DC) of the power supply circuit shown in FIG. 1 is 94% with regard to the secondary side DC output voltage Eo, 95% with regard to the secondary side DC output voltage Eo1 and approximately 94% with regard to the secondary side DC output voltage Eo2, and totally is approximately 90%.

Figure 14:
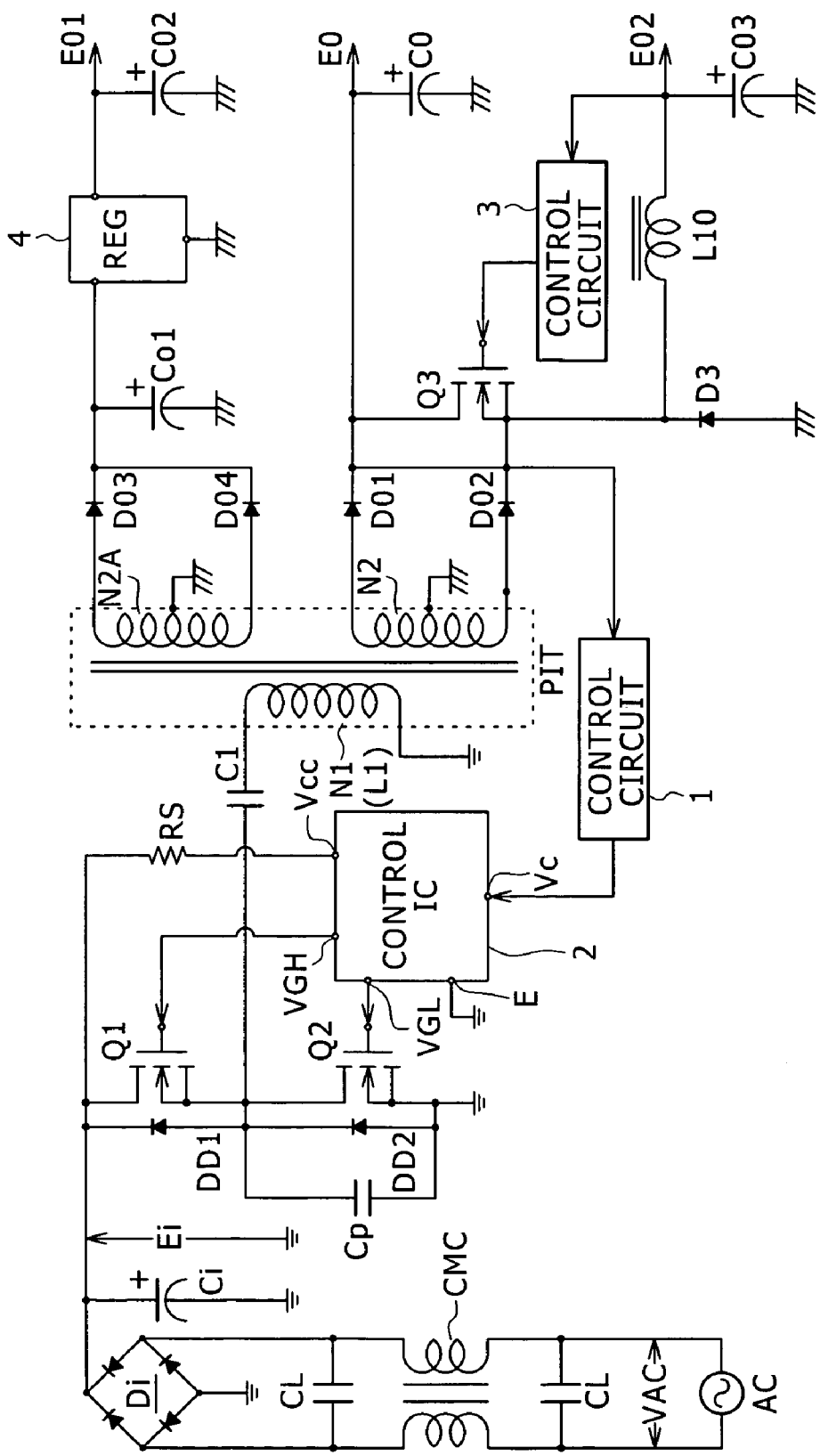
FIG. 14 is a circuit diagram showing an example of a configuration of a power supply circuit as a prior art.
Figure 15:
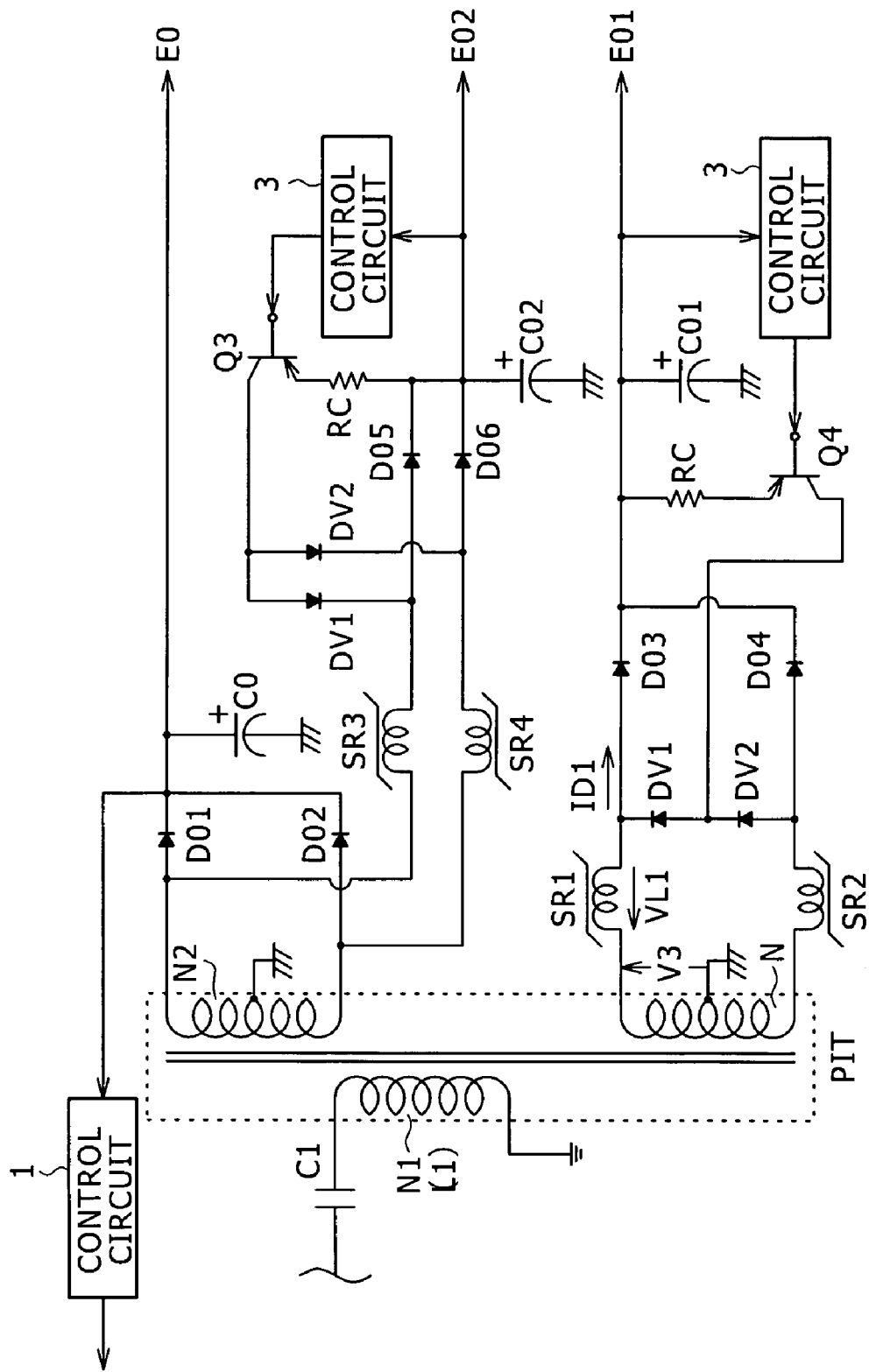
FIG. 15 is a circuit diagram showing another example of the configuration on the secondary side of the power supply circuit as the prior art.
Figure 16:
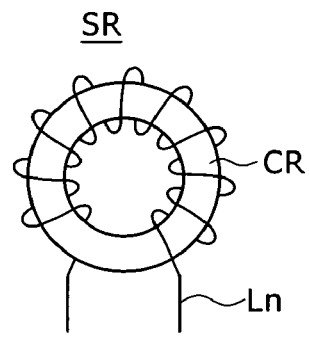
FIG. 16 is a view showing an example of a structure of a saturable inductor.
Figure 17:
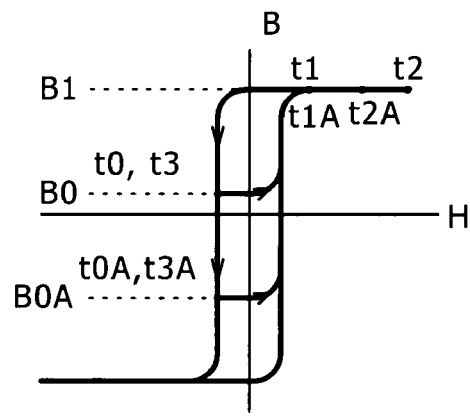
FIG. 17 is a characteristic diagram illustrating a B-H characteristic of the saturable inductor.
Figure 18:
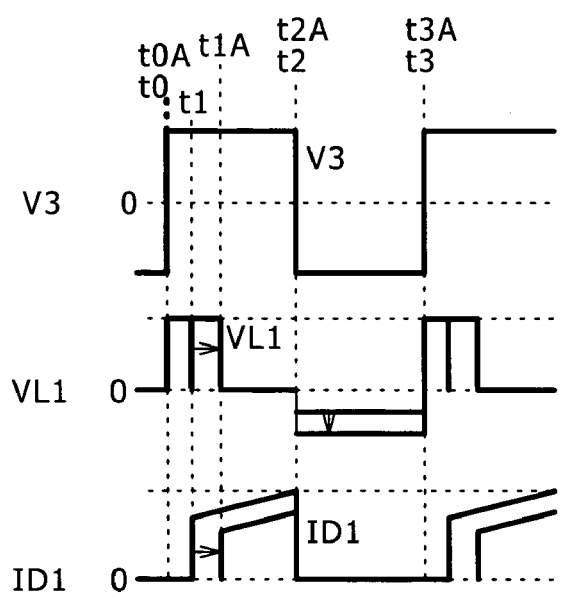
FIG. 18 is a waveform diagram illustrating constant voltage control operation by a magnetic amplifier which includes the saturable inductor.
Figure 19:
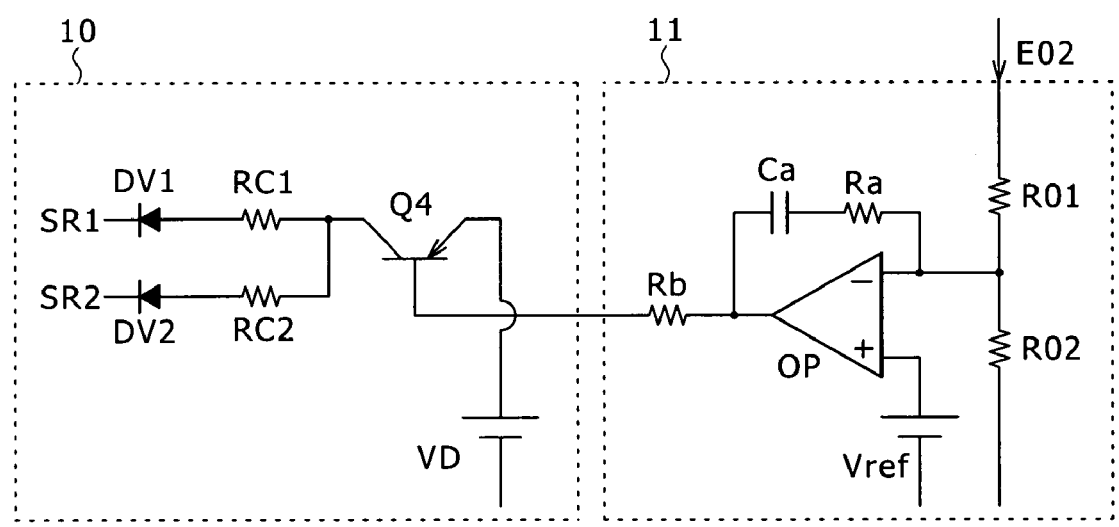
FIG. 19 is a circuit diagram equivalently showing a magnetic amplifier constant voltage circuit shown in FIG. 15.

In contrast, for example, the DC/DC power conversion efficiency of the circuits shown in FIGS. 14 and 15 is approximately 88% or 86%, and it can be seen that the circuit shown in FIG. 1 is enhanced in the power conversion efficiency. It is to be noted that, if the power losses of the power supply circuit of FIG. 1 and the power supply circuit of FIG. 14 are compared with each other, then the power loss of the power supply circuit of FIG. 1 exhibits a reduction by 1.5 W from that of the power supply circuit of FIG. 14. Further, the power loss of the power supply circuit of FIG. 1 indicates a reduction by 3.2 W from that of the power supply circuit of FIG. 15. Consequently, the circuit shown in FIG. 1 can eliminate the necessity for a heat radiating plate or the like for the secondary side constant voltage control circuit system. Where the necessity for a heat radiating plate is eliminated, reduction in size and weight of the circuit can be achieved as much.

Further, in the case of the constant voltage control circuit system on the secondary side shown in FIG. 1, even where the rectification circuit is a full-wave rectification circuit, the constant voltage control circuit system can be formed from the orthogonal control transformer PRT which is a variable inductance element and one control circuit 3.

For example, the orthogonal control transformer PRT requires a very low cost if compared with a saturable inductor which forms a magnetic amplifier. Also semiconductor elements which are provided in the control circuit 3 are only the transistor Q4 of 50 V/0.1 A and the shunt regulator Q3 which are less expensive as seen in FIG. 4.

As a result, when compared with a circuit configuration which includes, for example, the magnetic amplifier constant voltage circuit shown in FIG. 15, the circuit shown in FIG. 1 can be produced with a cost suppressed to approximately ½.

In this manner, the power supply circuit of the present embodiment is enhanced in the power conversion efficiency and can be produced at a much reduced cost when compared with the power supply circuit shown in FIG. 14 or 15. Further, the constant voltage control circuit on the secondary side in the power supply circuit of the present embodiment performs, when it performs adjustment of the inductance of the controlled winding NR of the orthogonal control transformer PRT, DC control of adjusting the control current (DC current level) to be supplied to the controlling winding NC, and involves no switching operation. Accordingly, the power supply circuit of the present embodiment does not suffer from the problem of interference between different switching frequencies which is a problem to the circuit of FIG. 14.

Incidentally, the secondary side shown in FIG. 1 adopts a configuration wherein the secondary side DC output voltages Eo, Eo1 and Eo2 are produced by respective full-wave rectification circuits. However, the configuration of the rectification circuits on the secondary side is not limited to a full-wave rectification circuit, but a rectification circuit of a different type may be used in accordance with the level of an actually required secondary side DC output voltage, an actually required load current amount and so forth.

Thus, four different modifications with regard to the configuration of the rectification circuit system which is ready for one secondary side DC output voltage are described with reference to FIGS. 6 to 9. It is to be noted that the secondary side DC output voltage obtained from the rectification circuits shown in the figures is, in the case of FIG. 1, the secondary side DC output voltage Eo1 or Eo2 which is stabilized by the orthogonal control transformer PRT.

Figure 6:
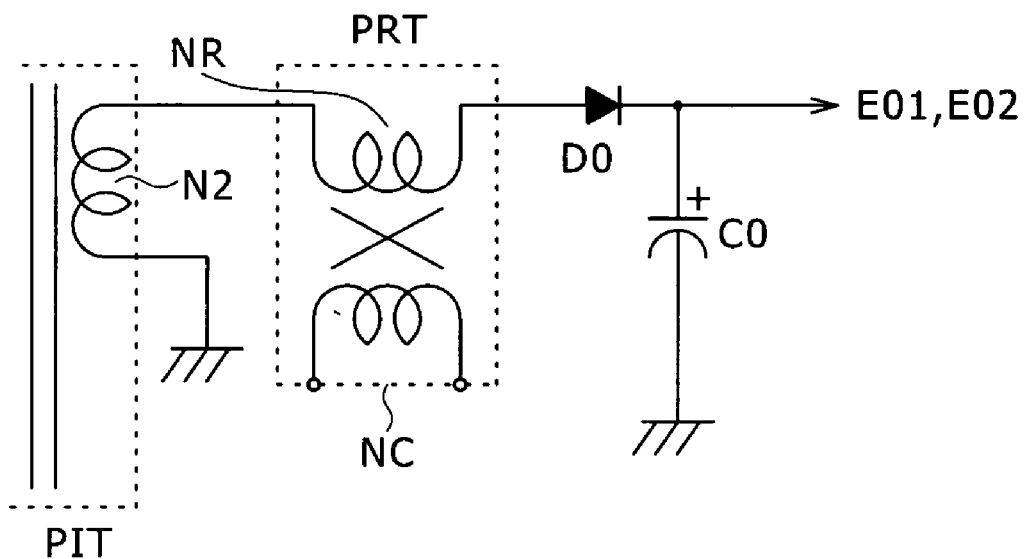
FIG. 6 is a circuit diagram illustrating a relationship between a modification to the secondary side rectification circuit and the insertion position of the controlled winding in the present embodiment.

First, the rectification circuit system shown in FIG. 6 includes a half-wave rectification circuit formed from a single rectification diode Do and a single smoothing capacitor Co and connected to the secondary winding N2.

Here, for example, when constant voltage control by the orthogonal control transformer PRT is performed, in the case of the full-wave rectification circuit shown in FIG. 1, it is necessary to insert the controlled winding NR of the orthogonal control transformer PRT into each of the rectification current paths formed within periods within which the alternating voltage of the secondary winding N2 has the positive and negative polarities.

In contrast, in the case of the half-wave rectification circuit shown in FIG. 6, within a period of one half wave within which rectification operation is performed, rectification current flows to a node between an end portion of the secondary winding N2 and the anode of the rectification diode Do5 without fail. In other words, rectification current does not flow along different rectification current paths from each other within different periods within which the alternating voltage of the secondary winding N2 has the positive and negative polarities within one cycle as in the case of a full-wave rectification circuit.

Accordingly, in the case wherein a half-wave rectification circuit is formed in such a manner as seen in FIG. 6, it is only necessary to insert a single controlled winding NR of the orthogonal control transformer PRT in series between the end portion of the secondary winding N2 and the node of the anode of the rectification diode Do5. In other words, in the case of the rectification circuit shown in FIG. 6, the number of controlled windings NR to be wound on the orthogonal control transformer PRT can be reduced from that in the case of a full-wave rectification circuit. By reducing the number of windings to be wound on the orthogonal control transformer PRT in this manner, for example, reduction of the cost required for the reduced number of windings can be anticipated, and the production efficiency of the orthogonal control transformer PRT is enhanced. Also it becomes possible to further miniaturize the orthogonal control transformer PRT.

Figure 7:
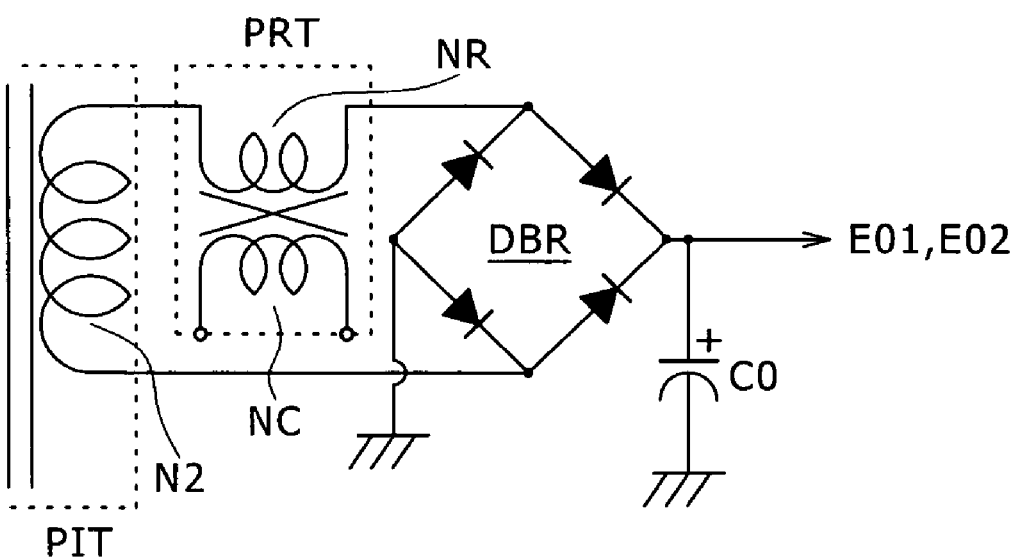
FIG. 7 is a circuit diagram illustrating a relationship between another modification to the secondary side rectification circuit and the insertion position of the controlled winding in the present embodiment.

FIG. 7 shows an example wherein a full-wave rectification circuit formed from a bridge rectification circuit DBR and a smoothing capacitor Co is connected to the secondary winding N2.

In the case of such a full-wave rectification circuit as just described, rectification current flows without fail along a line, for example, between the positive input terminal of the bridge rectification circuit DBR and the end portion of the secondary winding N2 within both periods within which the alternating voltage of the secondary winding N2 has the positive and negative polarities.

Therefore, also in this instance, it is only necessary to insert a single controlled winding NR of the orthogonal control transformer PRT into the line between the positive input terminal of the bridge rectification circuit DBR and the end portion of the secondary winding N2. It is to be noted that, even if the controlled winding NR is inserted into another line, for example, between the negative input terminal of the bridge rectification circuit DBR and the other end portion of the secondary winding N2, equivalent constant voltage control operation can be achieved.

Figure 8:
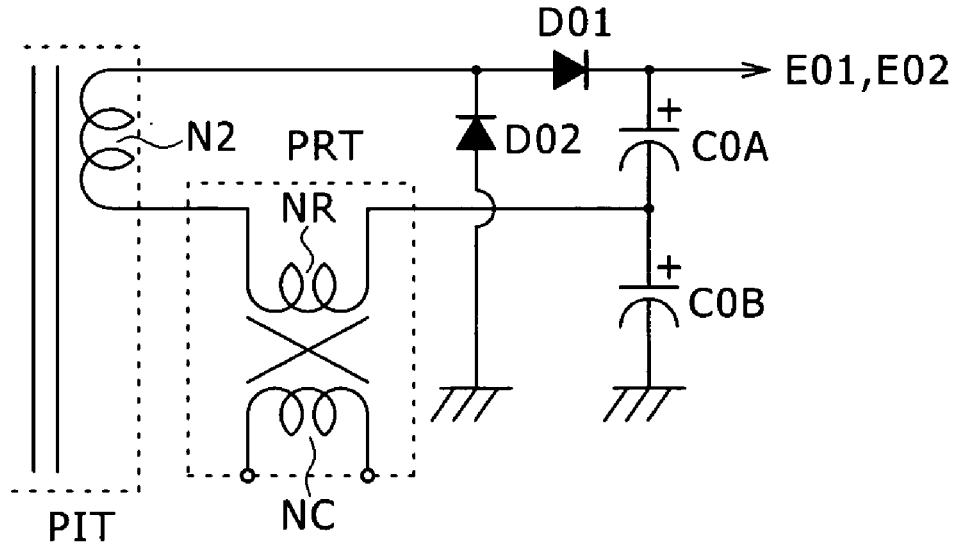
FIG. 8 is a circuit diagram illustrating a relationship between a further modification to the secondary side rectification circuit and the insertion position of the controlled winding in the present embodiment.

FIG. 8 shows a case wherein a voltage doubler rectification circuit is connected to the secondary winding N2.

The voltage doubler rectification circuit in this instance is formed by connecting two rectification diodes Do1 and Do2 and two smoothing capacitors CoA-CoB connected in series in such a connection scheme as shown in FIG. 8.

Also in this instance, the orthogonal control transformer PRT includes a single controlled winding NR which is inserted in series between the end portion of the secondary winding N2 and a node between smoothing capacitors CoA-CoB connected in series.

Here, rectification operation of the voltage doubler rectification circuit shown in FIG. 8 is described. First, within a period within which the alternating voltage of the secondary winding N2 has the positive polarity, rectification current flows along a path of the secondary winding N2→rectification diode Do1→smoothing capacitor CoA→controlled winding NR→secondary winding N2 to charge the smoothing capacitor CoA. Consequently, a rectification smoothed voltage of a level equal to the level of the alternating voltage obtained by the secondary winding N2 is obtained across the smoothing capacitor CoA.

On the other hand, within another period of time within which the alternating voltage of the secondary winding N2 has the negative polarity, rectification current flows along another path of the secondary winding N2→controlled winding NR→smoothing capacitor CoB→rectification diode Do2→secondary winding N2 to charge the smoothing capacitor CoB. Consequently, a rectification smoothed voltage of a level equal to the level of the alternating voltage obtained by the secondary winding N2 is obtained also across the smoothing capacitor CoB.

Since such rectification operation as described above is repeated after every one cycle, a rectification smoothed voltage of a level equal to twice the level of the alternating voltage of the secondary winding N2 is obtained as a voltage across the series circuit of the smoothing capacitors CoA-CoB. This rectification smoothed voltage becomes a secondary side DC output voltage. The secondary side DC output voltage by the voltage doubler rectification operation is obtained in this manner.

According to the rectification operation described above, rectification current flows through the single controlled winding NR, which is inserted between the end portion of the secondary winding N2 and the node between the smoothing capacitors CoA-CoB, within both periods within which the alternating voltage of the secondary winding N2 has the positive and negative polarities. In other words, also in this instance, the controlled winding NR is inserted in the paths along which rectification current flows within both periods within which the alternating voltage of the secondary winding N2 has the positive and negative polarities. Accordingly, also in this instance, only one controlled winding NR is required.

Figure 9:
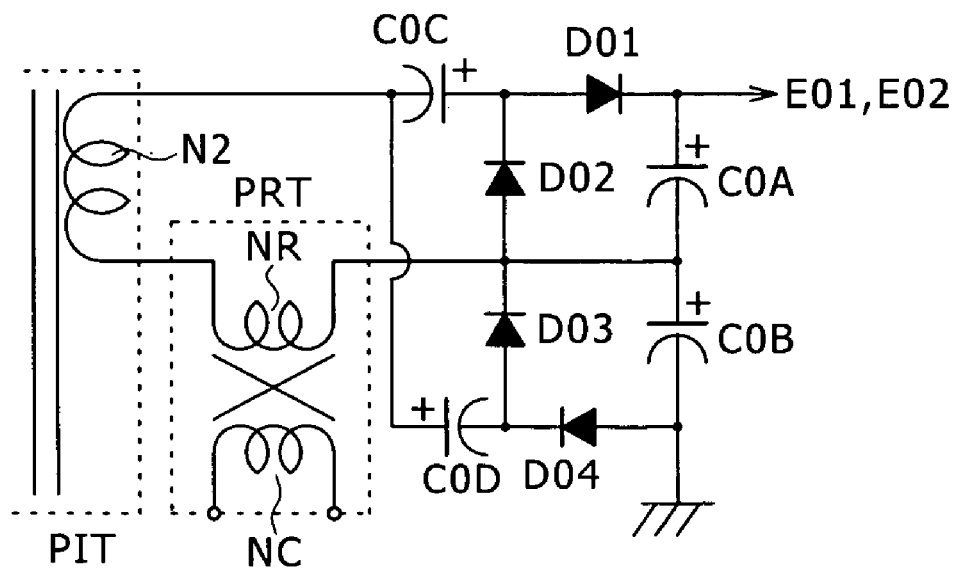
FIG. 9 is a circuit diagram illustrating a relationship between a still further modification to the secondary side rectification circuit and the insertion position of the controlled winding in the present embodiment.

The rectification circuit shown in FIG. 9 forms a voltage quadrupler rectification circuit. In the voltage quadrupler rectification circuit, voltage doubler rectification operation is performed by a rectification circuit section formed from rectification diodes Do1 and Do2 and smoothing capacitors CoA and CoC, and a rectification smoothed voltage of a level equal to twice the level of the alternating voltage of the secondary winding N2 is obtained as a voltage across the smoothing capacitor CoA.

Meanwhile, voltage doubler rectification operation is performed also by another rectification circuit section formed from rectification diodes Do3 and Do4 and smoothing capacitors CoB and CoD, and a rectification smoothed voltage of a level equal to twice the level of the alternating voltage of the secondary winding N2 is obtained as a voltage across the smoothing capacitor CoB.

As a result, as a secondary side DC output voltage which is a voltage across the smoothing capacitors CoA-CoB connected in series, a rectification smoothed voltage of a level equal to four times the level of the alternating voltage of the secondary winding N2 is obtained.

Also in this instance, only one controlled winding NR is required for the orthogonal control transformer PRT, and the orthogonal control transformer PRT is inserted in series between the end portion of the secondary winding N2 and the node between the smoothing capacitors CoA-CoB.

First, the voltage doubler rectification operation of the rectification circuit section formed from the rectification diodes Do1 and Do2 and the smoothing capacitors CoA and CoC is such as follows.

Within a period within which the alternating voltage of the secondary winding N2 has the negative polarity, rectification current flows along a path of the secondary winding N2→controlled winding NR→rectification diode Do2→smoothing capacitor CoC→secondary winding N2 to charge the smoothing capacitor CoC. Consequently, a DC voltage of a level equal to the level of the alternating voltage obtained by the secondary winding N2 is obtained as a voltage across the smoothing capacitor CoC.

On the other hand, within another period within which the alternating voltage of the secondary winding N2 has the positive polarity, rectification current flows along a path of the secondary winding N2→smoothing capacitor CoC→rectification diode Do1→smoothing capacitor CoA→controlled winding NR→secondary winding N2. At this time, since charging into the smoothing capacitor CoA is performed in such a manner that the voltage obtained across the smoothing capacitor CoC is superposed, a DC voltage of a level equal to twice the alternating voltage of the secondary winding N2 is obtained as a voltage across the smoothing capacitor CoA. Voltage doubler rectification operation is performed in this manner.

On the other hand, in the rectification circuit section formed from the rectification diodes Do3 and Do4 and the smoothing capacitors CoB and CoD, first within a period within which the alternating voltage of the secondary winding N2 has the positive polarity, rectification current flows along a path of the secondary winding N2→smoothing capacitor CoD→rectification diode Do3→controlled winding NR→secondary winding N2. Consequently, a DC voltage of a level equal to the level of the alternating voltage of the secondary winding N2 is obtained as a voltage across the smoothing capacitor CoD.

On the other hand, within another period within which the alternating voltage of the secondary winding N2 has the negative polarity, rectification current flows along another path of the secondary winding N2→controlled winding NR→smoothing capacitor CoB→rectification diode Do4→smoothing capacitor CoD→secondary winding N2. At this time, since charging into the smoothing capacitor CoB is performed in such a manner that the voltage obtained across the smoothing capacitor CoD is superposed, a DC voltage of a level equal to twice the alternating voltage of the secondary winding N2 is obtained as a voltage across the smoothing capacitor CoA. In short, voltage doubler rectification operation is performed.

According to such rectification operation as described above, in the rectification operation of any of the two rectification circuit sections, rectification current flows commonly through the controlled winding NR within both periods within which the alternating voltage of the secondary winding N2 has the positive and negative voltages. In short, also in this instance, only one controlled winding NR is required by insertion of the controlled winding NR at the position shown in FIG. 9.

Figure 10:
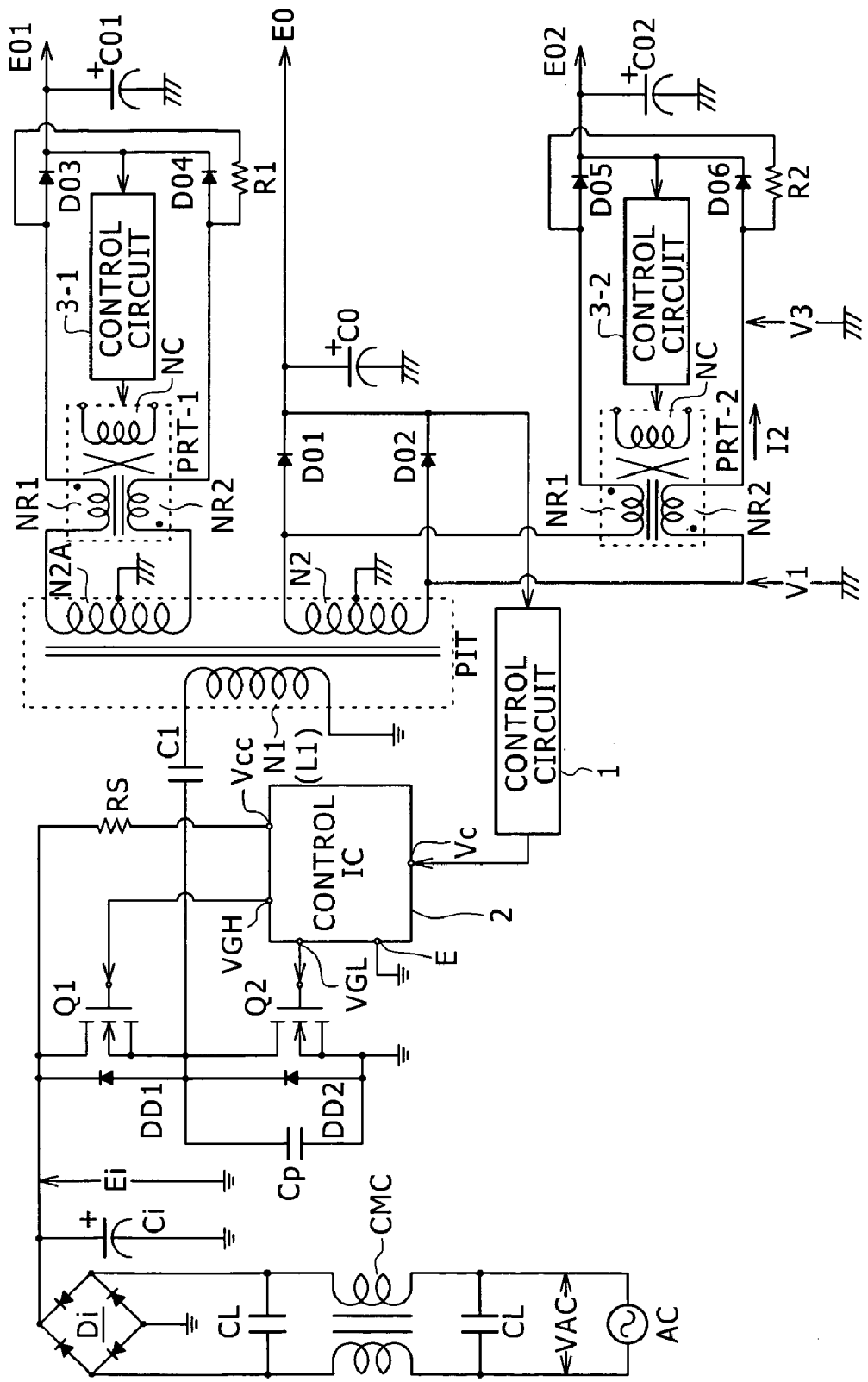
FIG. 10 is a circuit diagram showing an example of a configuration of a power supply circuit as a second embodiment.

FIG. 10 shows an example of a configuration of a power supply circuit as a second embodiment. It is to be noted that, in FIG. 10, like elements to those of FIG. 1 are denoted by like reference characters and description thereof is omitted herein.

The orthogonal control transformers PRT (orthogonal control transformers PRT-1 and PRT-2) shown in FIG. 10 may have a configuration similar to that of FIG. 2 described hereinabove.

Figure 11:
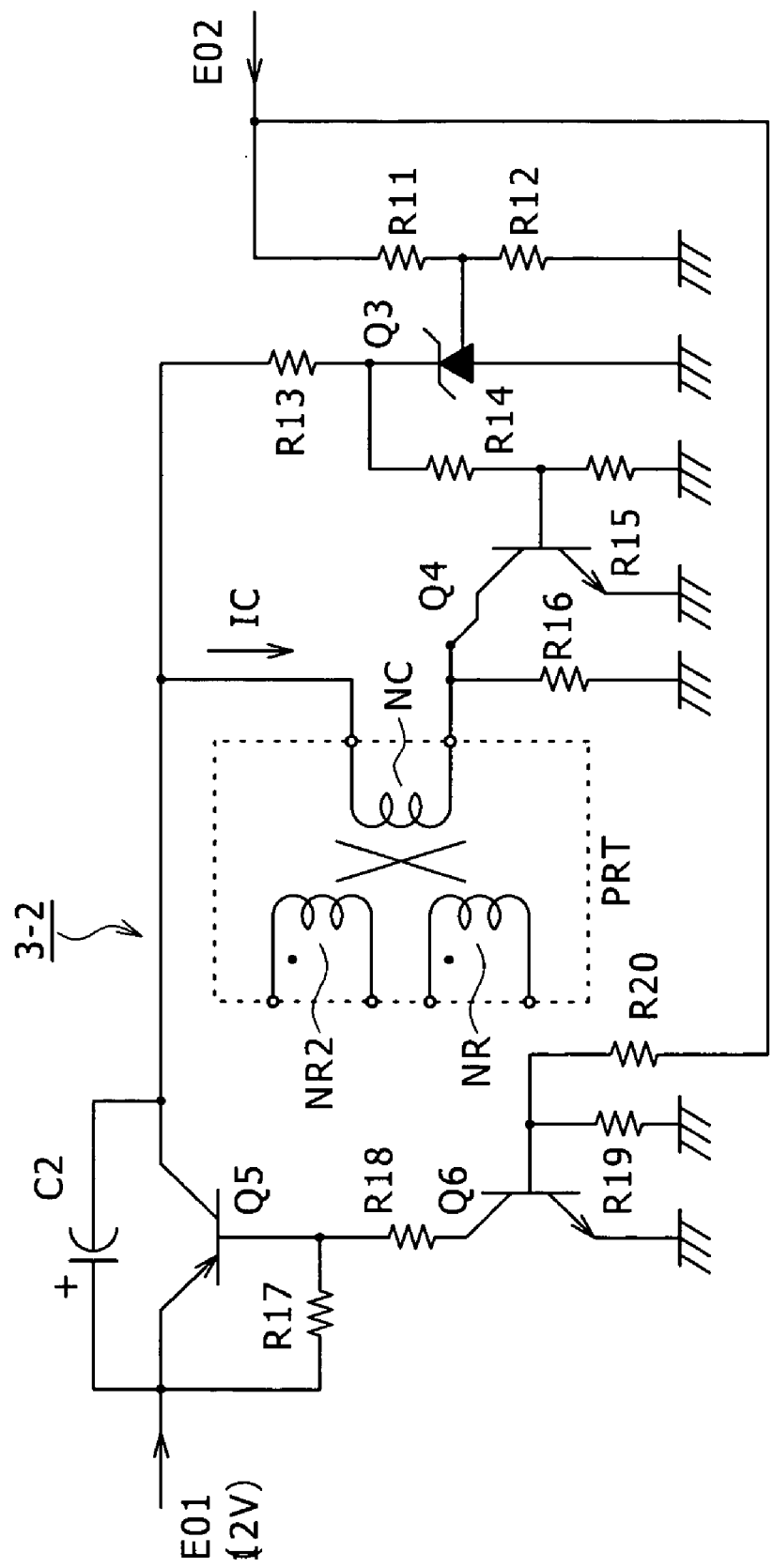
FIG. 11 is a circuit diagram showing an example of a configuration of a control circuit on the secondary side as the second embodiment.

In the power supply circuit shown in FIG. 10, the control circuit 3-2 on the secondary side which controls the inductance of the controlled windings NR (NR1, NR2) of the orthogonal control transformer PRT (PRT-1, PRT-2) on the secondary side is configured in such a manner as shown in FIG. 11. It is to be noted that, in FIG. 11, like elements to those of FIG. 4 are denoted by like reference characters and description thereof is omitted herein.

In the control circuit 3-2 shown in FIG. 11, a capacitor C2 is inserted with the polarities illustrated in FIG. 11 between the secondary side DC output voltage Eo1 which is a power supply line of 12 V and the controlling winding NC of the orthogonal control transformer PRT. The capacitor C2 in this instance is an electrolytic capacitor, and the positive electrode of the capacitor C2 is connected to the line of the secondary side DC output voltage Eo1 while the negative electrode of the capacitor C2 is connected to an end portion of the controlling winding NC.

Further, the emitter of a transistor Q5 is connected to the positive electrode of the capacitor C2, and the collector of the transistor Q5 is connected to the negative electrode of the capacitor C2. A resistor R17 is a base-emitter resistor of the transistor Q5.

The base of the transistor Q5 is connected to the collector of a transistor Q6 through a resistor R18. The emitter of the transistor Q6 is connected to the secondary side ground. The base of the transistor Q6 is connected to the line of the secondary side DC output voltage Eo2 through a resistor R20. A resistor R19 is a base-emitter resistor of the transistor Q6.

According to such a configuration of the control circuit 3-2 as described above, for example, if a commercial AC power supply AC is made available and the secondary side DC output voltage Eo1 builds up to a prescribed level, then control current Ic first flows from the line of the secondary side DC output voltage Eo1 to the controlling winding NC through the capacitor C2.

Thereupon, also the secondary side DC output voltage Eo2 builds up in response to the starting of the commercial AC power supply AC. However, if the secondary side DC output voltage Eo2 rises to a level higher than a predetermined level (for example, 2 V), then a base-emitter voltage sufficient to render the transistor Q6 conducting is obtained and places the transistor Q6 into an on state. In response to this, also the transistor Q5 is placed into an on state.

After the transistor Q5 is placed into an on state, the path of the control current Ic changes over from the line of the secondary side DC output voltage Eo1 to the path which includes the emitter-collector of the transistor Q5, and the control current Ic flows along the new path. Thereafter, the level of the control current Ic is controlled by operation of the error amplifier formed from the shunt regulator Q3 and the transistor Q4 in response to the level of the secondary side DC output voltage Eo2 as described hereinabove with reference to FIG. 4. Consequently, the secondary side DC output voltage Eo2 is stabilized, for example, at 3.3 V.

It is assumed here that load short-circuiting occurs with the secondary side DC output voltage Eo2. In this instance, the secondary side DC output voltage Eo2 drops to the zero level, and the transistor Q6 is controlled so as to change over from the on state till then to an off state in response to the drop of the secondary side DC output voltage Eo2. Thereupon, also the transistor Q5 is changed over into an off state.

After the transistor Q5 is placed into an off state in this manner, since the path along which the control current Ic is supplied is disconnected from the line of the secondary side DC output voltage Eo1, the control current Ic decreases to the 0 level. Consequently, the inductance of the controlled wirings NR1 and NR2 increases as described hereinabove with reference to FIG. 3.

Figure 12:
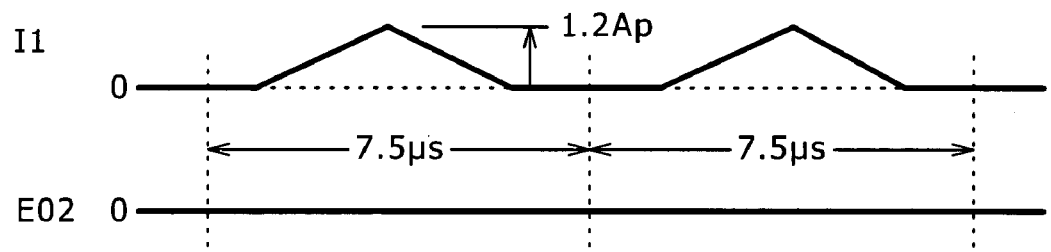
FIG. 12 is a waveform diagram illustrating load short-circuiting protection operation by the control circuit on the secondary side in the second embodiment.

The waveforms of the secondary side DC output voltage Eo2 and the rectification current I2 which flows through the rectification diodes Do5 and Do6 at this time are illustrated in FIG. 12.

As described hereinabove, when load short-circuiting occurs, the secondary side DC output voltage Eo2 continues to have the 0 level.

Then, although the rectification current I2 should originally increase to a very high level as a result of the load short-circuiting, since the control current Ic is suppressed to the 0 level and the controlled wirings NR1 and NR2 have increased inductances, the level of the rectification current I2 which flows in high frequency in accordance with the switching period is suppressed. For example, while the rectification current I2 flows at the level of 15 Ap as seen in FIG. 5 also in a steady state, it can be seen that, according to the waveform diagram of FIG. 12 which shows the waveforms upon load short-circuiting, the rectification current I2 is suppressed down to 1.2 Ap.

In other words, the control circuit 3-2 shown in FIG. 11 is furnished also with a function as a protection circuit ready for load short-circuiting of the secondary side DC output voltage Eo2. Such a load short-circuiting protection function as just described can be implemented by a simple and low-cost circuit which includes several resistance elements and so forth in addition to the transistors Q5 and Q6 and the capacitor C2 which are provided as principal components.

For example, in the configurations shown in FIGS. 14 and 15, if it is tried to provide a protection function against load short-circuiting, then it is necessary to form and connect a more complicated load short-circuiting protection circuit. Consequently, the circuit scale increases and increase of the cost is invited when compared with the present embodiment.

Further, in the power supply circuit as the second embodiment shown in FIG. 10, a resistor R1 is connected in such a manner as seen in FIG. 10, for example, to the constant voltage control circuit system for the secondary side DC output voltage Eo1. The resistor R1 is inserted between end portions of the two controlled wirings NR1 and NR2 on the rectification diode side.

Also to the constant voltage control circuit system corresponding to the secondary side DC output voltage Eo2, a resistor R2 is connected in a similar connection scheme.

For example, where the resistor R1 or R2 is not inserted in such a manner as described above, noise caused by parasitic oscillation is generated on the potential V3 between the node between the rectification diode and the controlled winding NR and the secondary side ground at a timing at which the rectification diode turns off.

Figure 13:
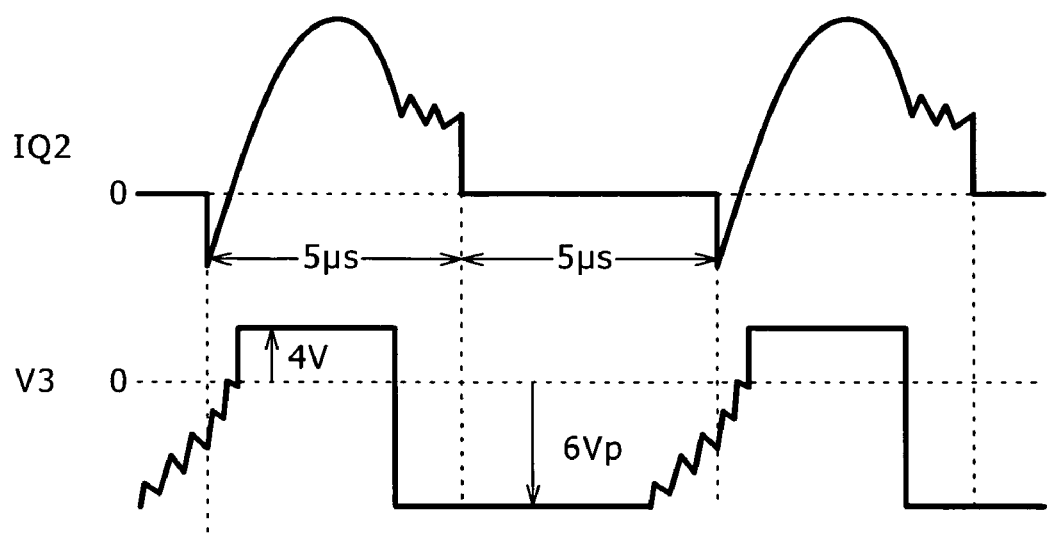
FIG. 13 is a waveform diagram illustrating operation of a secondary side rectification circuit where a resistor for parasitic oscillation noise removal is inserted in the second embodiment.

Therefore, where the resistors R1 and R2 are inserted in such a manner as seen in FIG. 10, such noise as parasitic oscillation as described above is removed as seen from the potential V3 of FIG. 13. It is to be noted that the current IQ2 illustrated in FIG. 13 is switching current which flows through the switching element Q2. The current IQ2 is illustrated in FIG. 13 in order to indicate that the variation of the potential V3 corresponds to the switching period.

For example, the peak level of a voltage as parasitic oscillation generated on the secondary side DC output voltage Eo1 on the 12 V line is 45 Vp, and corresponding to this, it is necessary to select a rectification diode part having a voltage resisting property of 60 V for the rectification diodes Do3 and Do4.

In contrast, where the resistor R1 is connected to remove parasitic oscillation as in the case of the present embodiment, a voltage withstanding property of only 40 V is required for the rectification diodes Do3 and Do4, and the cost for the rectification diodes can be reduced as much. Further, since a better characteristic can be obtained with a part whose voltage withstanding property is low, the reliability of the circuit is enhanced.

It is to be noted that the load short-circuiting protection circuit (refer to FIG. 11) of the control circuit 3-2 on the secondary side described as the second embodiment and the resistors (R1, R2) for parasitic oscillation removal need not necessarily be adopted in combination. In particular, for example, only the control circuit 3-2 which includes the load short-circuiting protection circuit shown in FIG. 11 may be added to the power supply circuit as the first embodiment shown in FIG. 1 which is used as a base circuit, or a configuration which includes only the resistors for parasitic oscillation removal may be adopted.

Also in the power supply circuit as the second embodiment, the rectification circuit systems for producing a secondary side DC output voltage shown in FIGS. 6 to 9 can be applied.

Further, the present invention is not limited to the configurations of the power supply circuits described hereinabove.

For example, for the switching elements, an element other than a MOS-FET such as, for example, an IGBT (Insulated Gate Bipolar Transistor) may be adopted only if it can be used in a separately excited fashion. Further, also the constants of the part elements described hereinabove may be changed in accordance with actual conditions and so forth.

Further, according to the present invention, the power supply circuit can be configured including a current resonance type converter which is of the self-excited type and uses a half bridge coupling system. In this instance, for example, a bipolar transistor can be selectively used for the switching elements.

Furthermore, for example, also for the circuit configuration for producing a secondary side DC output voltage on the secondary side of the insulating converter transformer PIT, a configuration different from those shown in the drawings may be adopted.

Further, the number of secondary side DC output voltages to be produced by the power supply circuit according to the present invention may be changed suitably, for example, in response to the load power for which the power supply circuit is to be ready, the number of required DC power supplies and so forth. Also the number of secondary windings to be wound on the secondary side of the insulating converter transformer PIT may be changed in response to the number of secondary side DC output voltages.

INDUSTRIAL APPLICABILITY

As described above, the switching power supply circuit of the present invention includes a current resonance type converter as a basic configuration of a primary side switching converter. Further, a plurality of secondary side DC output voltages are produced on the secondary side.

A particular one of the plural secondary side DC output voltages is controlled to a constant voltage by variably controlling the switching frequency of the primary side switching converter in response to the level of the secondary side DC output voltage.

Further, in order to control any one of the remaining secondary side DC output voltages which requires stabilization to a fixed voltage, a control transformer as a saturable reactor which includes a controlling winding and a controlled winding is provided corresponding to the secondary side DC output voltage. Then, the controlled winding is inserted into a rectification current path for producing the secondary side DC output voltage of the control object. Then, the level of control current to be supplied to the controlling winding is adjusted in response to the level of the secondary side DC output voltage of the control object to adjust the inductance of the controlled winding thereby to achieve stabilization of the secondary side DC output voltage of the control object.

With the configuration described above, since the power loss decreases when compared with an alternative case wherein a secondary side DC output voltage is stabilized by means of, for example, a series regulator, a step-down type converter or a magnetic amplifier, the power conversion efficiency of the power supply circuit is enhanced.

Further, as an actual circuit, it is necessary to provide only a control transformer as a saturable reactor and a circuit for adjusting the level of DC current (control current) to be supplied to the controlling winding of the control transformer in response to the secondary side DC output voltage level of the control object. Consequently, when compared similarly with an alternative case wherein a secondary side DC output voltage is stabilized by means of a series regulator, a step-down type converter or a magnetic amplifier, a configuration for stabilization can be obtained at a very low cost.

Furthermore, constant voltage control which utilizes a control transformer is control of variably controlling the level of DC current (control current) to be supplied to the controlling winding of the control transformer, and switching operation independent of the primary side switching converter is not involved. Accordingly, such interference between different switching frequency as in the case wherein a step-down type converter is adopted does not occur, and also the amount of noise which may be generated in the power supply circuit is decreased as much.

The invention claimed is:

1. A switching power supply circuit, comprising:
switching means including a switching element for receiving a DC input voltage as an input thereto to perform switching operation;
switching driving means for switching driving said switching element;
a converter transformer formed by winding thereon at least a primary winding to which a switching output obtained by the switching operation of said switching means is supplied and a plurality of secondary windings in each of which an alternating voltage as the switching output obtained in said primary winding is excited;
first DC output voltage production means for receiving the alternating voltage obtained in one of said plural secondary windings of said converter transformer as an input thereto to perform rectification operation to produce a first DC output voltage;
second DC output voltage production means for receiving the alternating voltage obtained in a different one of said plural secondary windings as an input thereto to perform rectification operation to produce a second DC output voltage, said second DC output voltage production means supplying a load thereto with power lower than that supplied by said first DC output voltage production means;

frequency controlled type constant voltage controlling means for controlling said switching driving means in response to the level of a first secondary side DC output voltage produced by said first DC output voltage production means to adjust the switching frequency of said switching means to perform constant voltage control for the first DC output voltage; and inductance controlled type constant voltage controlling means including a control transformer as a saturable reactor having a controlling winding and a controlled winding wound thereon, said controlled winding being inserted between the different secondary winding and said secondary DC output voltage production means, said inductance controlled type constant voltage controlling means adjusting the level of control current to be supplied to said controlling winding in response to the level of the second DC output voltage from said second DC output voltage production means to adjust the inductance of said controlled winding to perform constant voltage control for the second DC output voltage.

2. The switching power supply circuit according to claim 1, wherein said converter transformer is a transformer which includes a core having a central magnetic leg and has a gap provided on said central magnetic leg and wherein said primary winding and said plural secondary windings are wound on said central magnetic leg such that said transformer has a coupling coefficient which represents rough coupling.

3. The switching power supply circuit according to claim 2, wherein said switching means is a switching means including two switching elements connected between the DC input voltage and a reference potential and connected in cascade connection to each other through a nodal point, and said switching power supply circuit further comprises a series resonance circuit formed from a leakage inductance component of said primary winding of said converter transformer and a capacitance of a primary side series resonance capacitor connected in series to said primary winding and connected between the nodal point of the two switching elements and the reference potential, said series resonance circuit causing the switching output obtained by said switching means to resonate.

4. The switching power supply circuit according to claim 3, further comprising a partial resonance circuit including a parallel resonance capacitor connected in parallel to one of said two switching elements which is connected to the reference potential for performing partial resonance operation together with the leakage inductance component of said primary winding of said converter transformer.

5. The switching power supply circuit according to claim 3, wherein each of said plural secondary windings is divided into two divisional winding portions by a center tap connected to the reference potential such that alternating voltages whose periods of time within which the alternating voltages have the positive polarity or the negative polarity are different from each other are induced in the divisional winding portions, and each of said first and second DC output voltage production means is a full wave rectification and smoothing circuit which includes two rectifiers individually connected at one end portions thereof to the two divisional winding portions divided by the center tap and connected at the other end thereof commonly for rectifying the induced alternating voltages and a smoothing capacitor connected between the other ends of the two rectifiers and the reference potential.

6. The switching power supply circuit according to claim 5, further comprising a resistor connected between the two divided winding portions of each of said plural secondary windings.

7. The switching power supply circuit according to claim 1, wherein said inductance controlled type constant voltage controlling means includes:

a shunt regulator for producing an output of a level corresponding to an error of the level of the second DC output voltage; and an amplification circuit connected, while the first DC output voltage is supplied to one end of said controlling winding as power supply, to the other end of said controlling winding for amplifying and outputting the output of said shunt regulator as control current to said controlling winding.

8. The switching power supply circuit according to claim 7, wherein said inductance controlled type constant voltage controlling means stops the supply of power to said amplification circuit in response to occurrence of load short-circuiting with regard to the second DC output voltage, and said switching power supply circuit further comprises a switch circuit including a required number of transistor elements.

9. The switching power supply circuit according to claim 5, wherein said control transformer is an orthogonal controlled type transformer which includes a pair of controlled windings whose inductance is adjusted in response to adjustment of the level of the control current to be supplied to said controlling winding and on which said controlling winding is disposed so as to be orthogonal to the pair of controlled windings.

10. The switching power supply circuit according to claim 5, further comprising:

a full wave rectification and smoothing circuit provided in parallel to said first DC output voltage production means and including two rectifiers individually connected at one end portions thereof to the two divisional winding portions for rectifying the induced alternating voltages and a smoothing capacitor connected between the other ends of the two rectifiers connected commonly and the reference potential for supplying a third DC output voltage;

a control transformer including a pair of controlled windings and a pair of controlling windings individually connected in series between the two divisional winding portions and the two rectifiers; and second inductance controlled type constant voltage control means for adjusting the level of the control current to be supplied to said controlling winding in response to the level of the third DC output voltage from said full wave rectification and smoothing circuit to adjust the inductance of said controlled winding to perform constant voltage control for the third DC output voltage.

* * * * *

UNITED STATES PATENT AND TRADEMARK OFFICE
CERTIFICATE OF CORRECTION

PATENT NO. : 7,310,249 B2  Page 1 of 1
APPLICATION NO. : 10/536742
DATED : December 18, 2007
INVENTOR(S) : Masayuki Yasumura It is certified that error appears in the above-identified patent and that said Letters Patent is hereby corrected as shown below:

Column 28, line 2, "at one end portions" should read --at end portions--;

Column 28, line 46, "at one end portions" should read --at end portions--.

Signed and Sealed this

Tenth Day of March, 2009

JOHN DOLL
*Acting Director of the United States Patent and Trademark Office*